United States Patent
Mikami et al.

(10) Patent No.: US 8,700,935 B2
(45) Date of Patent: Apr. 15, 2014

(54) POWER SUPPLY UNIT CONFIGURED TO NOT CONTROL A POWER SUPPLY FROM REDUCING THE POWER STATE TO A MIRRORING UNIT AND STORAGE UNITS DURING A REBUILD OPERATION EVEN WHEN SUCH POWER REDUCING STATE IS SATISFIED

(75) Inventors: Fumio Mikami, Chigasaki (JP); Mikio Hama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 550 days.

(21) Appl. No.: 12/896,209

(22) Filed: Oct. 1, 2010

(65) Prior Publication Data

US 2011/0083026 A1 Apr. 7, 2011

(30) Foreign Application Priority Data

Oct. 6, 2009 (JP) ................................. 2009-232508

(51) Int. Cl.
*G06F 1/00* (2006.01)
*G06F 1/26* (2006.01)

(52) U.S. Cl.
USPC .......................... 713/323; 713/300; 713/320

(58) Field of Classification Search
USPC .......... 711/114; 713/323, 322, 320, 324, 300; 370/337, 445, 311
See application file for complete search history.

(56) References Cited

U.S. PATENT DOCUMENTS

| | | | | |
|---|---|---|---|---|
| 5,928,365 A * | 7/1999 | Yoshida | | 713/324 |
| 7,343,500 B2 * | 3/2008 | Igari | | 713/300 |
| 8,064,411 B2 * | 11/2011 | Ecclesine | | 370/337 |
| 8,219,837 B2 * | 7/2012 | Igari | | 713/320 |
| 8,245,055 B2 * | 8/2012 | O'Shea | | 713/300 |
| 8,265,713 B2 * | 9/2012 | Tashiro | | 455/574 |
| 8,321,692 B2 * | 11/2012 | Mikami et al. | | 713/300 |
| 2004/0128568 A1 * | 7/2004 | O'Shea | | 713/300 |
| 2005/0154934 A1 * | 7/2005 | Kim | | 713/323 |
| 2008/0082845 A1 * | 4/2008 | Morisawa | | 713/323 |
| 2008/0229125 A1 * | 9/2008 | Lin et al. | | 713/300 |
| 2008/0282100 A1 * | 11/2008 | Chen et al. | | 713/322 |
| 2009/0083560 A1 * | 3/2009 | O'Connell et al. | | 713/323 |
| 2009/0292871 A1 * | 11/2009 | Watanabe et al. | | 711/114 |
| 2010/0008276 A1 * | 1/2010 | Kopikare et al. | | 370/311 |
| 2010/0135318 A1 * | 6/2010 | Yin et al. | | 370/445 |
| 2010/0138677 A1 * | 6/2010 | Pagan et al. | | 713/320 |
| 2010/0165806 A1 * | 7/2010 | Mikami et al. | | 369/47.5 |
| 2010/0287397 A1 * | 11/2010 | Naor et al. | | 713/324 |
| 2010/0313043 A1 * | 12/2010 | Tsukada et al. | | 713/320 |

FOREIGN PATENT DOCUMENTS

JP 10-255451 A 9/1998

* cited by examiner

*Primary Examiner* — Thomas Lee
*Assistant Examiner* — Aurel Prifti
(74) *Attorney, Agent, or Firm* — Canon USA Inc. IP Division

(57) ABSTRACT

An information processing apparatus, when a shift condition for shifting a power state of the information processing apparatus to a power-saving state is satisfied, performs control to reduce power supply to a mirroring control unit and a plurality of storage units. Even when the shift condition has been satisfied, in a case that rebuild operation for the plurality of storage units is in progress, the information processing apparatus does not perform control to reduce power supply to the mirroring control unit and the plurality of storage units.

8 Claims, 17 Drawing Sheets

FIG. 12

| LIST OF EXPANDED COMMANDS | ATA TYPES |
|---|---|
| SETUP REBUILD | PIOOUT |
| START REBUILD | NONDATA |
| PAUSE REBUILD | NONDATA |
| RESTART REBUILD | NONDATA |
| SETUP PATROL | PIOOUT |
| START PATROL | NONDATA |
| PAUSE PATROL | NONDATA |
| RESTART PATROL | NONDATA |

FIG. 13

DATA TO BE SENT IN RESPONSE TO SETUP REBUILD COMMAND

| ADDRESS | SIZE | CONTENTS |
|---|---|---|
| 0000h~0003h | 4Byte | REBUILD EXTENSION TIME (UNIT: SECOND), EXTEND REBUILD BY THE TIME LENGTH |
| 0004h~0007h | 4Byte | AVAILABILITY OF AUTOMATIC REBUILD (0: AUTOMATIC REBUILD WHEN HDD IS REPLACED, 1: NOT AVAILABLE) |
| 0008h~000Bh | 4Byte | AVAILABILITY OF VERIFICATION AT THE TIME OF REBUILD |
| 000Ch~000Fh | 4Byte | REBUILD EXECUTION RANGE (0: ENTIRE REGION OF HDD, 1: REGION "A") |
| 0010h~0017h | 8Byte | FRONT SECTOR OF REGION "A" |
| 0018h~000Fh | 8Byte | SIZE OF REGION "A" |

FIG. 14

DATA TO BE SENT IN RESPONSE TO SETUP PATROL COMMAND

| ADDRESS | SIZE | CONTENTS |
|---|---|---|
| 0000h~0003h | 4Byte | PATROL EXTENSION TIME (UNIT: SECOND), EXTEND PATROL BY THE TIME LENGTH |
| 0004h~0007h | 4Byte | START CONDITION (0: AUTOMATIC START INVALID, 1 TO 100: PATROL STARTS WHEN ACTIVATED SPECIFIED NUMBER OF TIMES) |
| 0008h~000Bh | 4Byte | EXECUTION RANGE (0: ENTIRE REGION OF HDD, 1: REGION "A") |
| 000Ch~000Fh | 4Byte | RESERVED |
| 0010h~0017h | 8Byte | FRONT SECTOR OF REGION "A" |
| 0018h~000Fh | 8Byte | SIZE OF REGION "A" |

POWER SUPPLY UNIT CONFIGURED TO NOT CONTROL A POWER SUPPLY FROM REDUCING THE POWER STATE TO A MIRRORING UNIT AND STORAGE UNITS DURING A REBUILD OPERATION EVEN WHEN SUCH POWER REDUCING STATE IS SATISFIED

BACKGROUND OF THE INVENTION

1. Field of the Invention

The present invention generally relates to information processing and, more particularly, to an information processing apparatus, and a power supply control method for an information processing apparatus.

2. Description of the Related Art

Japanese Patent Application Laid-Open No. 10-255451 discusses a power supply control method for a mirroring system, in which a system is protected by simultaneously writing data into a plurality of hard disk drives (HDDs). Further, Japanese Patent Application Laid-Open No. 10-255451 discusses that, after writing into the HDDs is completed, a power of the HDDs is turned off.

Further, the functions of a mirroring control unit of such a type inserted as an addition of option between a system control central processing unit (CPU) and the HDDs include (1) a mirror function (1), a rebuild function (2), and a patrol function (3) as described below.

The mirror function (1) corresponds to a function for executing simultaneous writing on all HDDs connected, in response to a write command from a host. The rebuild function (2) corresponds to a function for copying onto an HDD from a copying source HDD to a copying destination, when an HDD has failed. The patrol function (3) corresponds to a function for executing a reading test of the HDDs connected for all regions at a predetermined timing, during a normal service.

As described above, there are available three functions in which the mirroring system can be implemented, i.e., the mirror function (1), the rebuild function (2), and the patrol function (3). In particular, for the rebuild and patrol functions (2) and (3), processing can be executed even when the system control CPU does not operate.

However, conventionally, even in such a case, power is supplied to the system control CPU. In the conventional configuration, the above-described rebuild and/or patrol functions (2) or (3) is required, even though their operation(s) are enabled by supplied power of several watts only to the mirroring control circuit and the HDDs, to supply power consumption of several tens of watts to the system control CPU for several tens of minutes to several hours.

If a configuration to suspend the rebuild or the patrol when entering into a sleep mode is employed, power-saving can be implemented. However, in such a configuration, in an apparatus with a setting of frequently entering into the sleep mode, a significant number of days may be required to secure energization for a length of accumulative time required until operation of the rebuild or the patrol is completed. In this case, the system protection by the mirroring system cannot be carried out for that period of time.

SUMMARY OF THE INVENTION

The present invention is directed to an information processing apparatus and a control method for an information processing apparatus, where the information processing apparatus is configured to supply power to a plurality of storage devices, in a case where execution of specific operation is in progress by a mirroring control unit that controls mirroring control to the plurality of storage devices, while implementing power-saving by stopping power supply to a control unit that executes control of the entire information processing apparatus.

According to an aspect of the present invention, an information processing apparatus includes a system control unit configured to execute control of the entire information processing apparatus, a plurality of storage units, a mirroring control unit configured to control mirroring control for the plurality of storage units, a first power supply unit configured to supply power to the system control unit, a second power supply unit configured to supply power to the mirroring control unit and the plurality of storage units, a power supply control unit configured to control the second power supply unit to reduce power supply to the mirroring control unit and the plurality of storage units, when a shift condition for shifting a power state of the information processing apparatus to a power-saving state is satisfied, wherein, even when the shift condition has been satisfied, in a case that rebuild operation for the plurality of storage units is in progress by the mirroring control unit, the power supply control unit does not control the second power supply unit to reduce power supply to the mirroring control unit and the plurality of storage units.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

FIG. 12 illustrates a list of vendor-unique expanded commands.

FIG. 13 illustrates an example of data to be sent from the system control unit to the mirroring control circuit when a SETUP REBUILD command is executed.

FIG. 14 illustrates data to be sent from the system control unit to the mirroring control circuit when a SETUP PATROL command is executed.

DESCRIPTION OF THE EMBODIMENTS

Various exemplary embodiments, features, and aspects of the invention will be described in detail below with reference to the drawings.

An information processing apparatus according to an exemplary embodiment of the present invention is a system in which a mirroring unit is inserted between a host and hard disk drives (HDDs) so that it can be optionally set up. This type of the mirroring unit has features (1) to (3) described below.

(1) While the rebuild is in progress, a writing operation from the mirroring unit to an HDD is executed, even if an issue of the write command from the host is stopped, when the host performs shutdown. To shut off an energization to the HDD while the writing operation to the HDD is in progress, creates a possibility of causing failure to the HDD. (2) The mirroring unit may be installed on an apparatus that frequently shifts to a sleep mode, or an apparatus in which a length of time during which a power is cut off is long. In such a case, since an energization time to the HDD is short, a time required for completion of the rebuild processing may not be available sufficiently. For this reason, there is a possibility that the system protection operation by the mirroring cannot be executed over a long period of time. (3) If the mirroring unit is installed on the apparatus that shifts frequently to the sleep mode, or the apparatus in which a length of time during which the power is cut off is long, there is a possibility that the energization time to the HDD is short, and a sufficient length of time required for the patrol function to be executed cannot be secured.

Mirroring is a function for executing a simultaneous writing operation to all connected HDDs in response to the write command from the host. Rebuild is a function, when an HDD fails, for copying from a copying source HDD to a copying destination HDD. Patrol is a function for executing a reading test of the connected HDDs under a normal service for the entire region at a predetermined timing.

Figure 1:
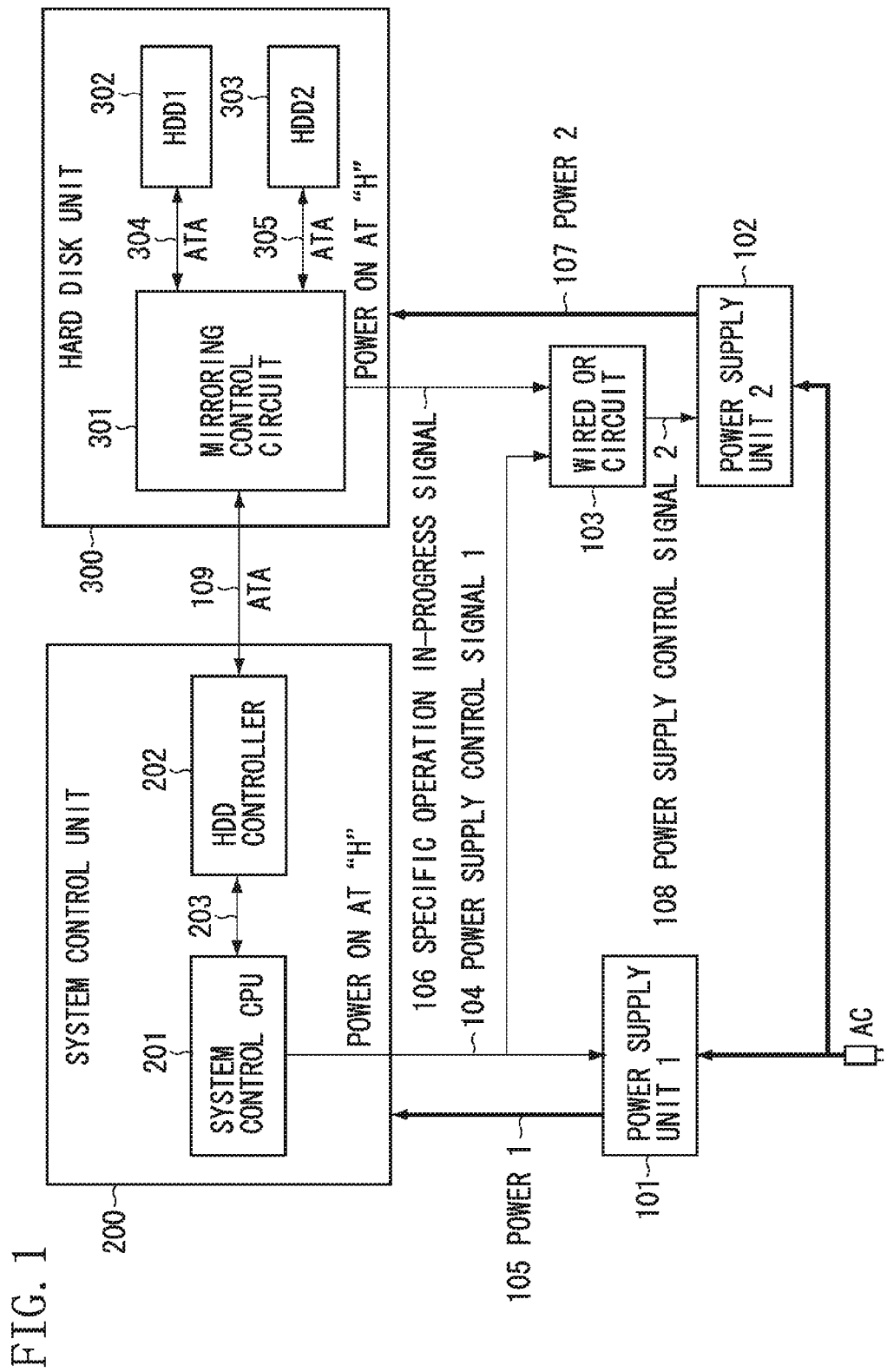
FIG. 1 is a block diagram illustrating an example of a power supply control configuration of an information processing apparatus according to a first exemplary embodiment of the present invention.

FIG. 1 is a block diagram illustrating an example of a power supply control configuration of an information processing apparatus according to a first exemplary embodiment of the present invention. In FIG. 1, a system control unit 200 acts as a main body control unit (main control unit) that controls a system of the information processing apparatus main body.

In the system control unit 200, a system control central processing unit (CPU) 201 is used to execute system control. An HDD controller 202 interfaces with an Advanced Technology Attachment (ATA) signal according to instructions from the system control CPU 201. A control signal line 203 connects the system control CPU 201 and the HDD controller 202.

An HDD unit 300 is connected to the system control unit 200 via the ATA signal line 109. In the HDD unit 300, a mirroring control circuit 301 is connected between the HDD controller 202 and each of an HDD1 302 and an HDD2 303. The mirroring control circuit 301 is connected to the HDD1 302 via an ATA signal line 304, and is connected to the HDD2 303 via an ATA signal line 305. In this case, the HDDs connected to the mirroring control circuit 301 may be three or more. The mirroring control circuit 301 executes access control to a plurality of storage devices in response to instructions from the system control unit 200.

A power supply unit 1 (first power supply unit) 101 is used to supply power to the system control unit 200. The power supply unit 1 (101), when a signal state of a power supply control signal 1 (first power supply control signal) 104 is high ("H"), supplies power to the system control unit 200. In other words, the power supply control signal 1 (104) indicates a power supply state to the system control unit 200. A power supply unit 2 (second power supply unit) 102 is used to supply power to the HDD unit 300. The power supply unit 2 (102), when a signal state of the power supply control signal 2 (second power supply control signal) 108 is "H", supplies power to the HDD unit 300. The power supply unit 1 (101) and the power supply unit 2 (102) are independently off/on controlled in response to the power supply control signal 1 (104) and the power supply control signal 2 (108), respectively.

A specific operation in-progress signal 106 is a signal in which a signal state becomes "H" when the mirroring control circuit 301 is currently executing a specific operation including the rebuild operation or the patrol operation. The specific operation is an access operation to the HDDs, in which the system control CPU 201 does not involve, and is an operation executable even when the system control CPU 201 is in a non-operation state. In other words, the specific operation in-progress signal 106 indicates an execution state of the above-described specific operation.

A wired OR circuit 103 generates the power supply control signal 2 (108) as a logical sum of the power supply control signal 1 (104) and the specific operation in-progress signal 106. More specifically, the wired OR circuit 103 monitors a power supply state to the system control unit 200 and an execution state of the above-described specific operation. Then, in at least one case, of a case where power is being supplied to the system control unit 200 and a case where execution of the above-described specific operation is in progress, the wired OR circuit 103 acts to cause the power supply unit 2 (102) to supply power to the HDD unit 300. The mirroring control circuit 301 is inserted between the HDD controller 202 and the HDDs in an optionally settable mode, and controls the mirroring operation. For this reason, the system control CPU 201 does not need to change control depending on whether it is executing the mirroring operation.

Figure 2:
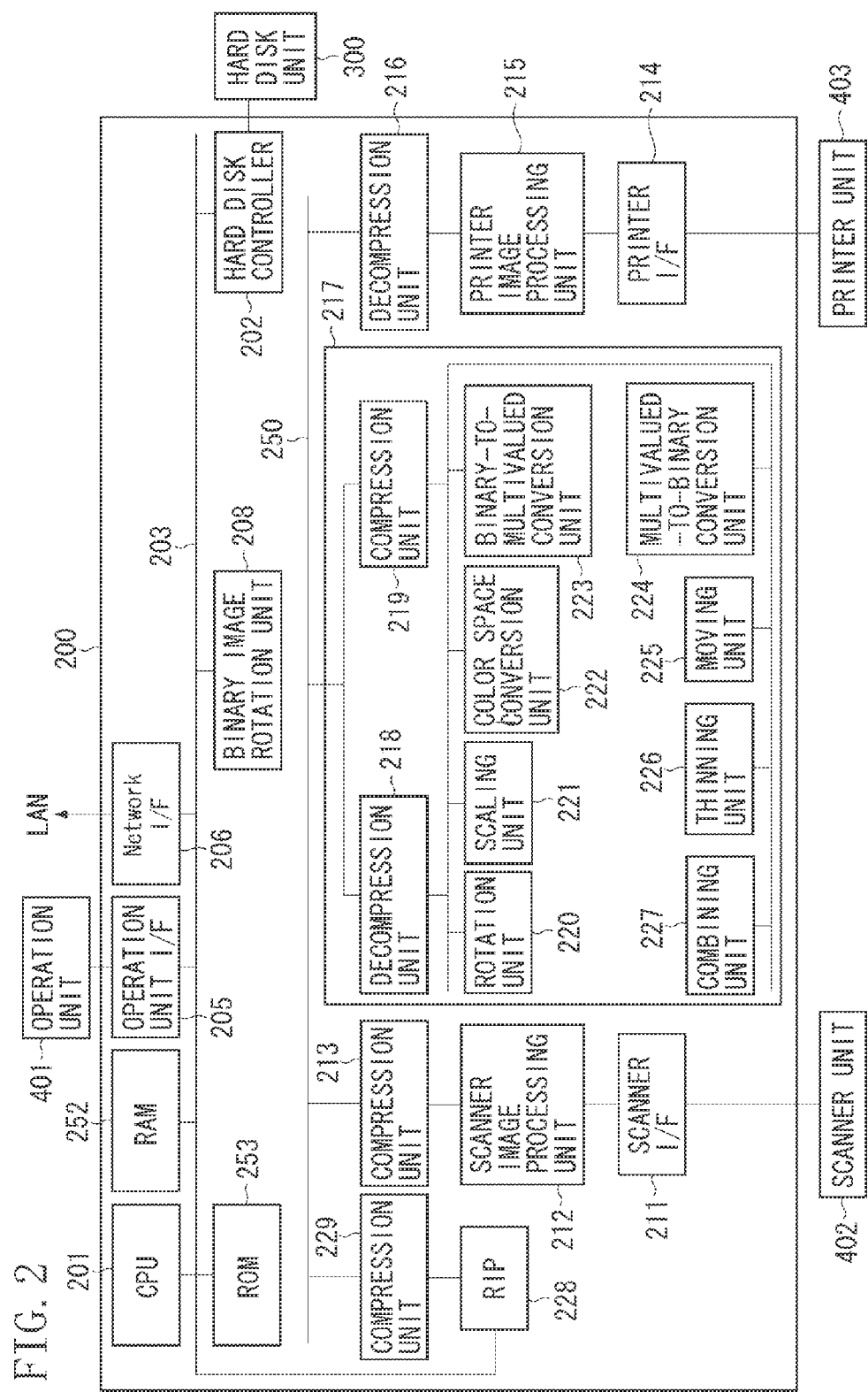
FIG. 2 is a block diagram of a multifunction peripheral (MFP) in which a circuit illustrated in FIG. 1 is mounted.

FIG. 2 is a block diagram of a multifunction peripheral (MFP) in which a circuit illustrated in FIG. 1 is mounted. The same reference numerals are assigned to the same components to those in FIG. 1, and descriptions thereof will not be repeated. In FIG. 2, the system control unit 200 has a controller function of the MFP, and is electrically connected to an operation unit 401, a scanner unit 402, and a printer unit 403. On the other hand, the system control unit 200 can make communication of image data or device information with a personal computer (PC) or external apparatuses or the like via a local area network (LAN).

The system control CPU 201 comprehensively controls accesses to various types of devices that are connected to one another, based on a control program stored in the read-only memory (ROM) 253, and comprehensively controls various processing executed inside the controller (the system control unit 200). The random-access memory (RAM) 252 is a system work memory for the system control CPU 201 to operate, and is also a memory used to temporarily store the image data. The RAM 252 is constituted of a static RAM (SRAM) that holds the stored content, even after a power is turned off, and a dynamic RAM (DRAM), in which the stored content will be erased after the power is turned off. In the ROM 253, a boot program of the apparatus is stored.

The HDD unit 300 is connected the HDD controller 202. The system software or the image data can be stored in the HDD 1 (302) and the HDD 2 (303) included in the HDD unit 300.

An operation unit interface (I/F) 205 is an interface unit for connecting the system bus 203 and the operation unit 401. The operation unit I/F 205 receives from the system bus 203 the image data for displaying on the operation unit 401, outputs it to the operation unit 401, and outputs information input from the operation unit 401 to the system bus 203.

A network I/F 206 is connected to the LAN and the system bus 203, and controls connection to the LAN. An image bus 250 is a transmission line for exchanging the image data, and is constituted of a peripheral component interface (PCI) bus.

A scanner image processing unit 212 executes correction, processing, and edition, on the image data received via the scanner I/F 211 from the scanner unit 402. An image conversion unit 217 includes a decompression unit 218, a compression unit 219, a rotation unit 220, a scaling unit 221, a color space conversion unit 222, a binary-to-multivalued conversion unit 223, a multivalued-to-binary conversion unit 224, a moving unit 225, a thinning unit 226, and a combining unit 227, and performs image processing on the image data. The decompression unit 216 decompresses the image data. The printer image processing unit 215 receives and rasterizes the image data from the decompression unit 216. The printer unit 403 performs print processing of the image data received via the printer I/F 214.

Figure 3:
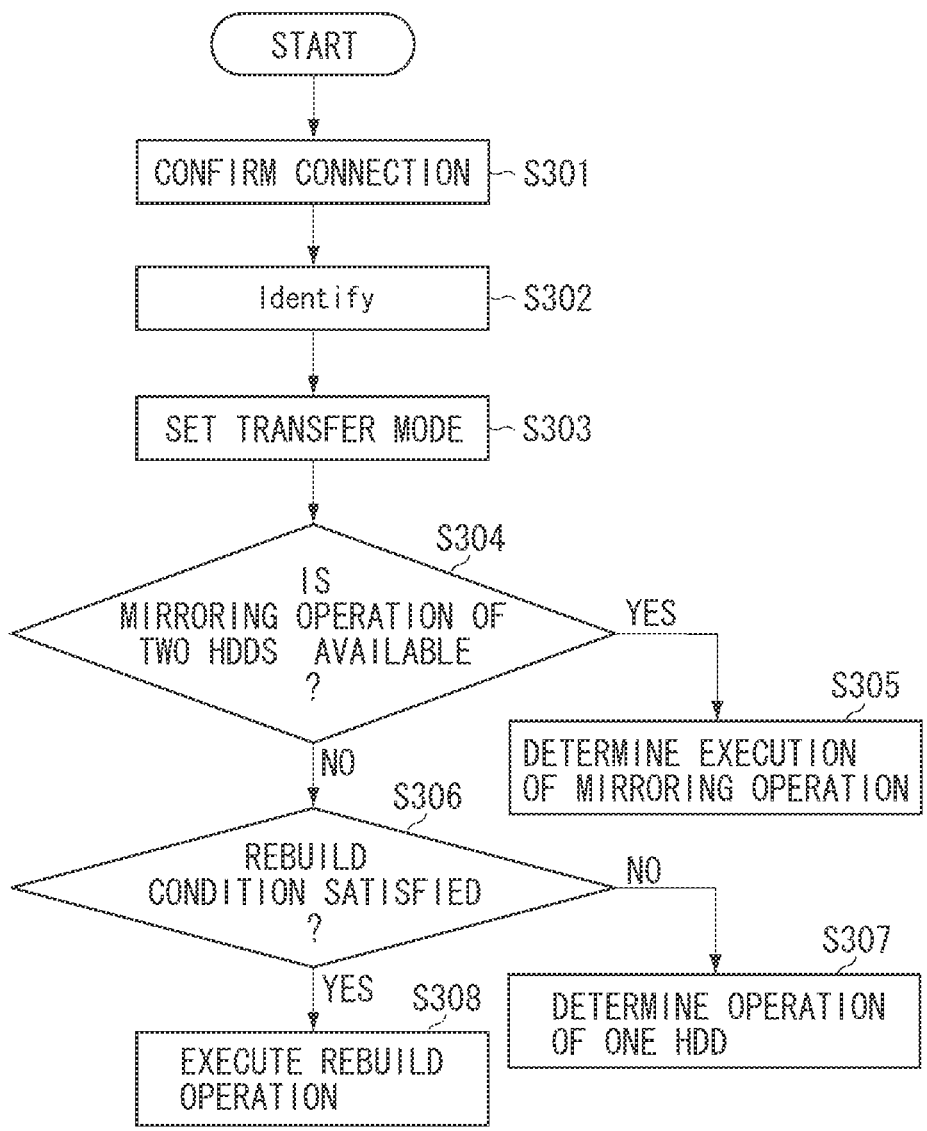
FIG. 3 is a flowchart illustrating a mirroring operation.

The mirroring operation, the rebuild operation, and the patrol operation by the mirroring control circuit 301 will be described below if a patrol activation start condition is satisfied, referring to FIG. 1 and FIG. 3 to FIG. 5. FIG. 3 is a flowchart illustrating the mirroring operation by the mirroring control circuit 301. A processing of the flowchart is implemented by the mirroring control circuit 301 by executing the software recorded in the storage unit that is built in the mirroring control circuit 301.

In step S301, the mirroring control circuit 301, after activation, confirms connection to the HDD1 302 and the HDD2 303. Next, in step S302, the mirroring control circuit 301 issues an Identify command to the HDDs confirmed in step S301, and acquires detailed information (capacity, model name, performance, etc.) from the HDDs. Next, in step S303, the mirroring control circuit 301 executes transfer mode setting.

Next, in step S304, the mirroring control circuit 301 determines whether the mirroring operation of two HDDs or one HDD is available, based on a result of the above-described steps S301 to S303. Then, if the mirroring control circuit 301 determines that the mirroring operation on two HDDs is available (YES in step S304), then in step S305, the mirroring control circuit 301 determines execution of the mirroring operation of the two HDDs.

On the other hand, if the mirroring control circuit 301 determines that the mirroring operation in the two HDDs is not available (NO in step S304), then in step S306, the mirroring control circuit 301 determines whether the rebuild condition is satisfied. In this case, "rebuild condition is satisfied" refers to a case where, for example, one HDD out of two HDDs is replaced with a new HDD.

Then, if the mirroring control circuit 301 determines that the rebuild condition is not satisfied (NO in step S306), then in step S307, the mirroring control circuit 301 determines an operation of one HDD. On the other hand, if the mirroring control circuit 301 determines that the rebuild condition is satisfied (YES in step S306), then in step S308, the mirroring control circuit 301 executes the rebuild operation. Then, after the rebuild operation is completed, the mirroring control circuit 301 determines the mirroring operation of the two HDDs.

The mirroring control circuit 301 transmits an ATA command from the HDD controller 202 to the determined one or two HDDs. The system control CPU 201 for the HDD controller 202 makes no intervention of any kind to the mirroring control circuit 301 for the purpose of execution of the mirroring operation.

A write command from the system control CPU 201 to the HDD is transmitted to the mirroring control circuit 301 via the HDD controller 202. In response to this, the mirroring control circuit 301 issues simultaneously the write command from the above-described system control CPU 201 to the plurality of HDDs being connected.

In addition, a read command from the system control CPU 201 to the HDDs is transmitted to the mirroring control circuit 301 via the HDD controller 202. In response to this, the mirroring control circuit 301 issues the read command to any one of the HDDs that are connected.

Figure 4:
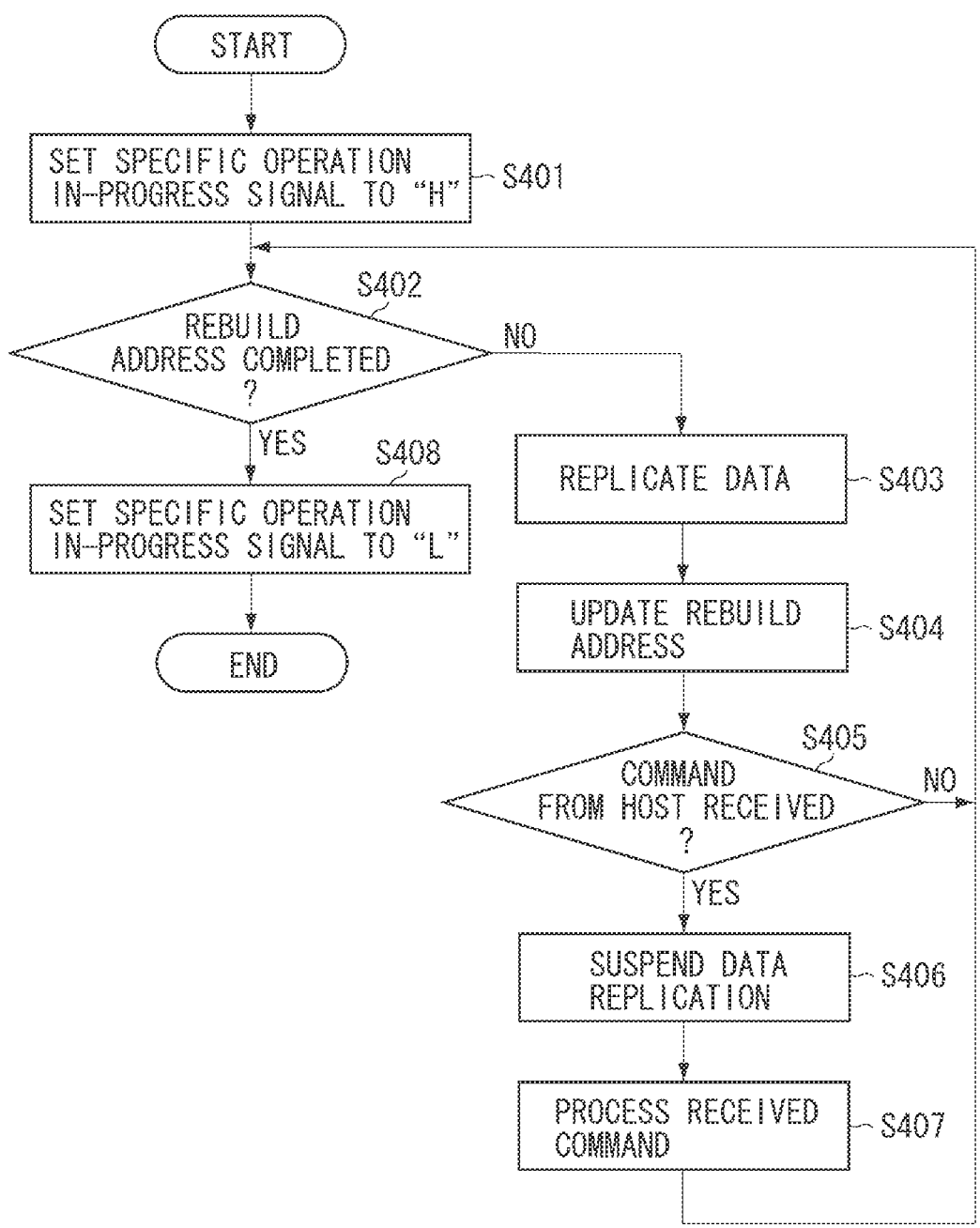
FIG. 4 is a flowchart illustrating a rebuild operation by a mirroring control circuit.

FIG. 4 is a flowchart illustrating the rebuild operation by the mirroring control circuit 301. Processing of the flowchart is implemented by the mirroring control circuit 301 by executing the software (firmware) recorded in a storage unit (e.g., a ROM or a flash memory) that is built into the mirroring control circuit 301.

The mirroring control circuit 301, upon recognizing that one HDD has been replaced (the rebuild condition has been satisfied), starts the rebuild operation. First, in step S401, the mirroring control circuit 301 sets the specific operation in-progress signal 106 to "H". Next, in step S402, the mirroring control circuit 301 sets a rebuild address for a front address of the HDD previously connected, and determines whether the rebuild address is completed (data replication of the entire region of the previously connected HDD is completed). Then, if it is determined that the rebuild address is not yet completed (NO in step S402), then the processing proceeds to step S403.

In step S403, the mirroring control circuit 301 replicates data stored at the rebuild address of the previously connected HDD onto a newly connected HDD. Then in step S404, the mirroring control circuit 301 updates the rebuild address by a unit of replication.

Next, in step S405, the mirroring control circuit 301 determines whether a command from the host (the system control unit 200) is received. If it is determined that the command has not been received (NO in step S405), then the processing returns to step S402.

On the other hand, if it is determined that the command from the host (the system control unit 200) has been received in the above-described step S405 (YES in step S405), then in step S406, the mirroring control circuit 301 suspends data replication (rebuild processing). Then in step S407, the mirroring control circuit 301 processes the command received from the above-described host. Then, when the processing of the command is completed, the mirroring control circuit 301 returns the processing to step S402.

On the other hand, if the mirroring control circuit 301 determines that the rebuild address is completed in the above-described step S402 (YES in step S402), then the mirroring control circuit 301 sets the specific operation in-progress signal 106 to low ("L"), and terminates the processing of the flowchart.

The mirroring control circuit 301 is provided with a storage unit (e.g., a flash memory) that stores HDD address (suspended location) in which the rebuild has been processed, suspended in response to the command or the like from the system control CPU 201. When the command processing is completed and the rebuild processing is resumed, the mirroring control circuit 301 executes rebuild continued from the suspension, based on the HDD address in which the rebuild has been processed, stored in the above-described storage unit.

In relation to the rebuild operation, the system control CPU 201 does not need to be concerned therewith from start until completion. In other words, the rebuild processing is an access to the HDD in which the system control CPU 201 is not involved, and is also processing executable even when the system control CPU 201 is not in the operation state.

Figure 5:
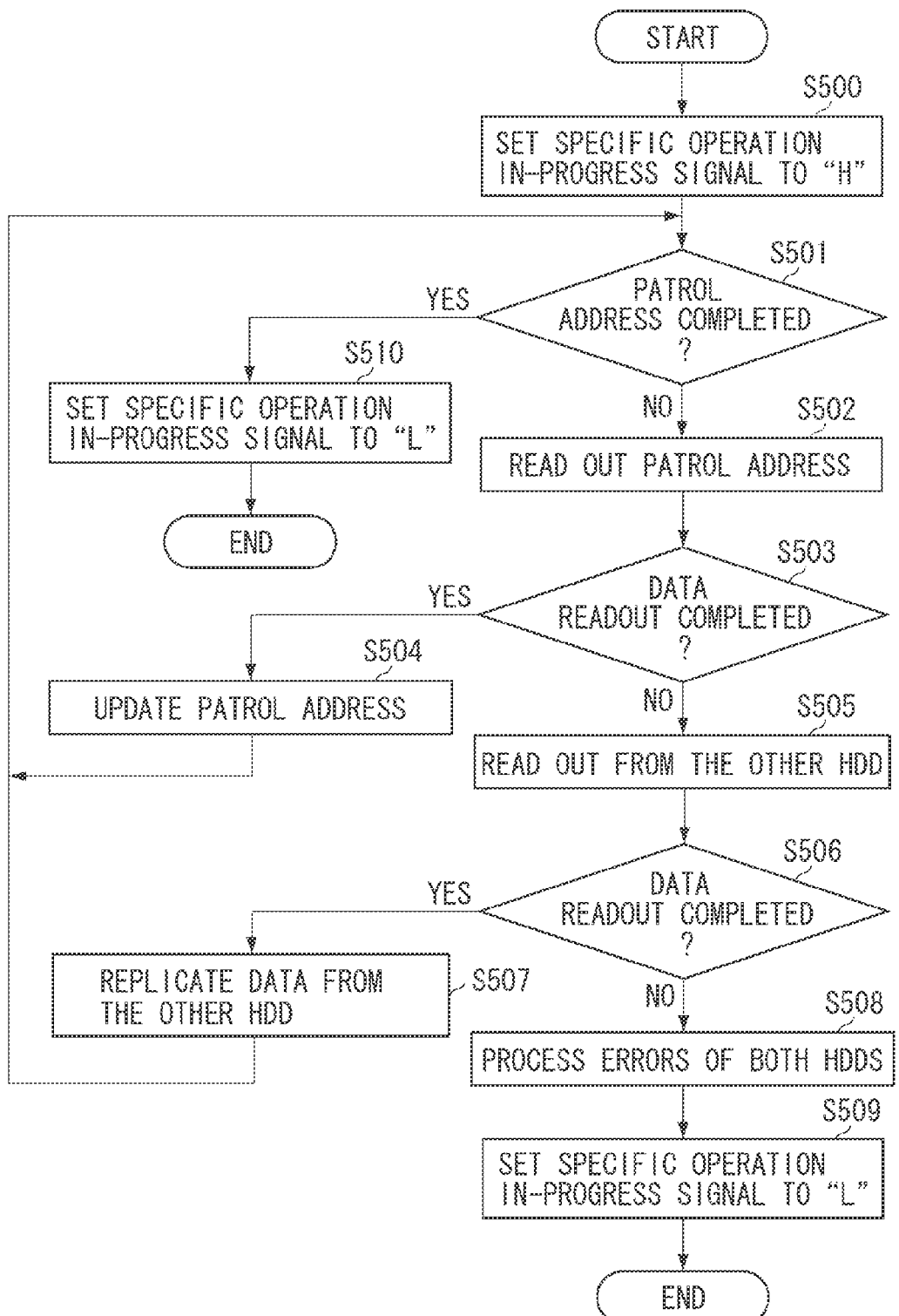
FIG. 5 is a flowchart illustrating a patrol operation by the mirroring control circuit.

FIG. 5 is a flowchart illustrating the patrol operation by the mirroring control circuit. Processing of the flowchart is implemented by the mirroring control circuit 301 by executing the software recorded in the storage unit that is built into the mirroring control circuit 301.

When there is no access to the HDDs for a predetermined length of time, the patrol function is activated. First, in step S500, the mirroring control circuit 301 sets the specific operation in-progress signal 106 to "H". Next, in step S501, the mirroring control circuit 301 sets a patrol address to a front address of either one of the HDDs connected, and determines whether the patrol address is completed (whether readout of data contained in the entire region of the above-described HDD is completed). Then, if it is determined that the patrol address is not yet completed (NO in step S501), then the processing proceeds to step S502.

In step S502, the mirroring control circuit 301 executes readout processing of data stored at the patrol address of the above-described HDD. In step S503, the mirroring control circuit 301 determines whether data readout in the readout processing is completed. Then, if it is determined that the data readout is completed in the above-described step S503 (YES in step S503), then in step S504, the mirroring control circuit 301 updates the patrol address by a unit of read out address, and returns the processing to step S501. On the other hand, if it is determined that data readout is not completed in the above-described step S503 (NO in step S503), then the mirroring control circuit 301 advances the processing to step S505. In step S505, the mirroring control circuit 301 executes readout processing of data stored at the patrol address of the other HDD. In step S506, the mirroring control circuit 301 determines whether data has been read out successfully in the readout processing. Then, if it is determined that the data has been read out successfully in the above-described step S506 (YES in step S506), then in step S507, the mirroring control circuit 301 replicates the data read out from the patrol address of the above-described other HDD onto the above-described HDD to execute data recovery, and returns the processing to step S501. On the other hand, if it is determined that the data has not been read out successfully in the above-described step S506 (NO in step S506), then in step S508, the mirroring control circuit 301 processes errors of both HDDs (executes processing for notifying the system control unit 200 that both HDDs are erred and causing the operation unit 401 to display them). Then in step S509, the mirroring control circuit 301 sets the specific operation in-progress signal 106 to "L", and terminates the processing of the flowchart.

If the mirroring control circuit 301 determines that the patrol address is completed in the above-described step S501 (YES in step S501), then in step S510, the mirroring control circuit 301 sets the specific operation in-progress signal 106 to "L", and terminates the processing of the flowchart.

Though not illustrated, the mirroring control circuit 301, upon receiving a command or the like from the system control CPU 201, suspends the patrol processing, even when the patrol processing is in progress. The mirroring control circuit 301, as described above, is provided with a storage unit that stores the suspended HDD address on which the rebuild has been processed (suspended location). When the command processing is completed and the rebuild processing is resumed, the mirroring control circuit 301 executes rebuild continued from the suspension, based on the HDD address on which the rebuild has been processed, stored in the above-described storage unit.

In relation to the patrol operation too, the system control CPU 201 does not need to be concerned therewith, from start until completion. In other words, the patrol processing is also an access to the HDD in which the system control CPU 201 is not involved, and is processing executable even in a state where the system control CPU 201 is not operating.

Figure 6:
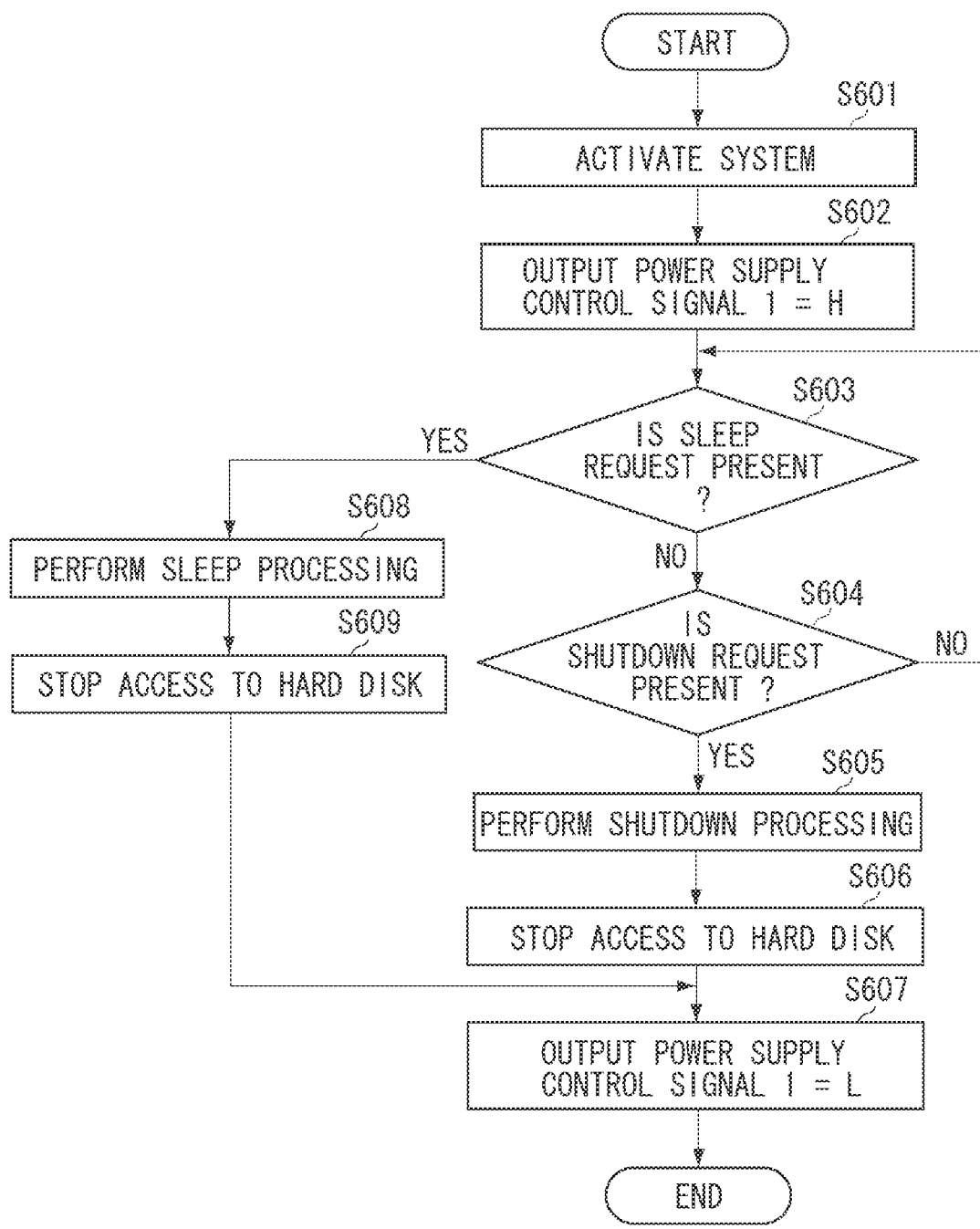
FIG. 6 is a flowchart illustrating an operation by a system control central processing unit (CPU).

An operation by the system control CPU 201 will be described below with reference to FIG. 1 and FIG. 6. FIG. 6 is a flowchart illustrating an operation by the system control CPU 201. Processing of the flowchart is implemented by the system control CPU 201 by executing the software recorded in the ROM 253 or the HDD1 or the HDD2.

In step S601, the system control CPU 20 activates the system, when a power is turned on, and sets the power supply control signal 1 (104) to "H", and the processing proceeds to step S603. In step S603, the system control CPU 201 determines whether a sleep request is present (whether a sleep condition is satisfied). If it is determined that the sleep request is present (YES in step S603), the processing proceeds to step S608.

In step S608, the system control CPU 201 performs processing of shift condition to the sleep state. In step S609, the system control CPU 201 stops access to the HDD, sets the power supply control signal 1 (104) to "L", and terminates the processing of the flowchart.

On the other hand, if it is determined that the sleep request is absent in the above-described step S603 (NO in step S603), then in step S604, the system control CPU 201 determines whether a shutdown request is present. If it is determined that the shutdown request is not present (NO in step S604), then the processing returns to step S603. On the other hand, if it is determined that the shutdown request is present in the above-described step S604 (YES in step S604), the system control CPU 201 advances the processing step S605. In step S605, the system control CPU 201 performs the shutdown processing. In step S606, the system control CPU 201 stops access to the HDD, sets the power supply control signal 1 (104) to "L", and terminates the processing of the flowchart.

As illustrated in FIG. 1, the information processing apparatus according to the first exemplary embodiment is configured so that a power supply system to the system control unit 200 and the HDD unit 300 can be independently off/on controlled.

When the system is operating normally, "H" as the power supply control signal 1 (104) is output from the system control unit 200 to the power supply unit 1 (101) and the wired OR circuit 103. At this time, "H" as the power supply control signal 1(104) is input, and accordingly the power supply unit 1 (101) supplies power (power 1) to the system control unit 200.

At this time, "H" as the power supply control signal (104) is input, and accordingly the wired OR circuit 103 outputs the "H" as the power supply control signal 2 (108) to the power supply unit 2 (102), regardless of the specific operation in-progress signal 106. In other words, at this time, the "H" as the power supply control signal 2 (108) is input, and accordingly the power supply unit 2 (102) supplies power (power 2) to the HDD unit 300.

In this state, when the HDD2 303 is replaced with a new HDD due to its failure or the like, the mirroring control circuit 301 starts the rebuild operation in accordance with the rebuild condition, and simultaneously sets the specific operation in-progress signal 106 to "H". If, for example, 80 GB HDD is used, about 30 minutes is required to complete rebuild.

If a patrol activation start condition is satisfied, the mirroring control circuit 301 starts the patrol operation and sets the specific operation in-progress signal 106 to "H". The patrol function is to watch an activation start condition every six days of a job, for example, and the patrol activation start condition includes a setting in which the patrol function starts when a job does not occur for thirty minutes. The patrol function is an important function, along with the mirroring, for securing reliability of the HDDs. However, in an apparatus with a setting of frequent shutdown or sleep, such a situation occurs that a time required for the patrol function to be activated is not available, or even when activated, the apparatus is energized only for a short time and then suspended.

Here, an operation when an instruction to shift to shutdown is given by the operator (or when the sleep condition is satisfied), during the rebuild (or patrol) operation, will be described. The system control unit 200 stops outputting the power supply unit 1 (101) by setting the power supply control signal 1 (104) to "L" after executing shutdown processing (sleep processing), so that a power of the system is turned off. However, the specific operation in-progress signal 106 is set to "H" during the rebuild (or patrol) operation. Accordingly, the power supply control signal 2 (108) as an output of the wired OR circuit 103 becomes "H", and the supply of power (power 2) to the HDD unit 300 by the power supply unit 2 (102) is continued.

At the time, when the rebuild (or patrol) is completed, the specific operation in-progress signal 106 shifts to "L", and the power supply control signal 2 (108) also becomes "L". As a result, the supply of power (power 2) to the HDD unit 300 by the power supply unit 2 (102) is stopped. At this time, a power (power supply) of the entire apparatus is stopped. The system control CPU 201 is mounted in the system control unit 200. The system control unit 200 is required to control the scanner unit 402, the printer unit 403, the operation unit 401, and the image processing units 212 and 215 as illustrated in FIG. 2, and consumes power of several tens of watts. During the shift condition to the shutdown or sleep, operations of the scanner unit 402, the printer unit 403, the operation unit 401, the image processing units 212 and 215, and the like become unnecessary. As a result, a power supply to the system control unit 200 can be shut off.

However, the HDD unit 300 connected to the system control unit 200 is exceptional. The HDD unit 300, while the rebuild operation or the patrol function beyond control of the system control CPU 201 is in progress, can complete the operation without shutting off the power. In addition, while the rebuild operation or the patrol function is in progress, it is possible to shut off the power to the system control unit 200 independently of the HDD unit 300.

As described above, according to the present exemplary embodiment, while carrying out power-saving by stopping power supply to the system control unit 200, system protection by mirroring can be implemented by performing power supply to the HDD unit 300, while execution of the rebuild or the patrol function is in progress.

Hence, even when the rebuild or patrol operation is in progress, the system control unit 200 can be shifted to the shutdown or the sleep, and power-saving can be carried out without causing a failure to the HDD. Further, when the system control unit 200 is shifted to the shutdown or the sleep, the supply of power to the HDD unit 300 is maintained, and as a result of which the system protection by the mirroring can be implemented by completing the rebuild or patrol operation.

Figure 7:
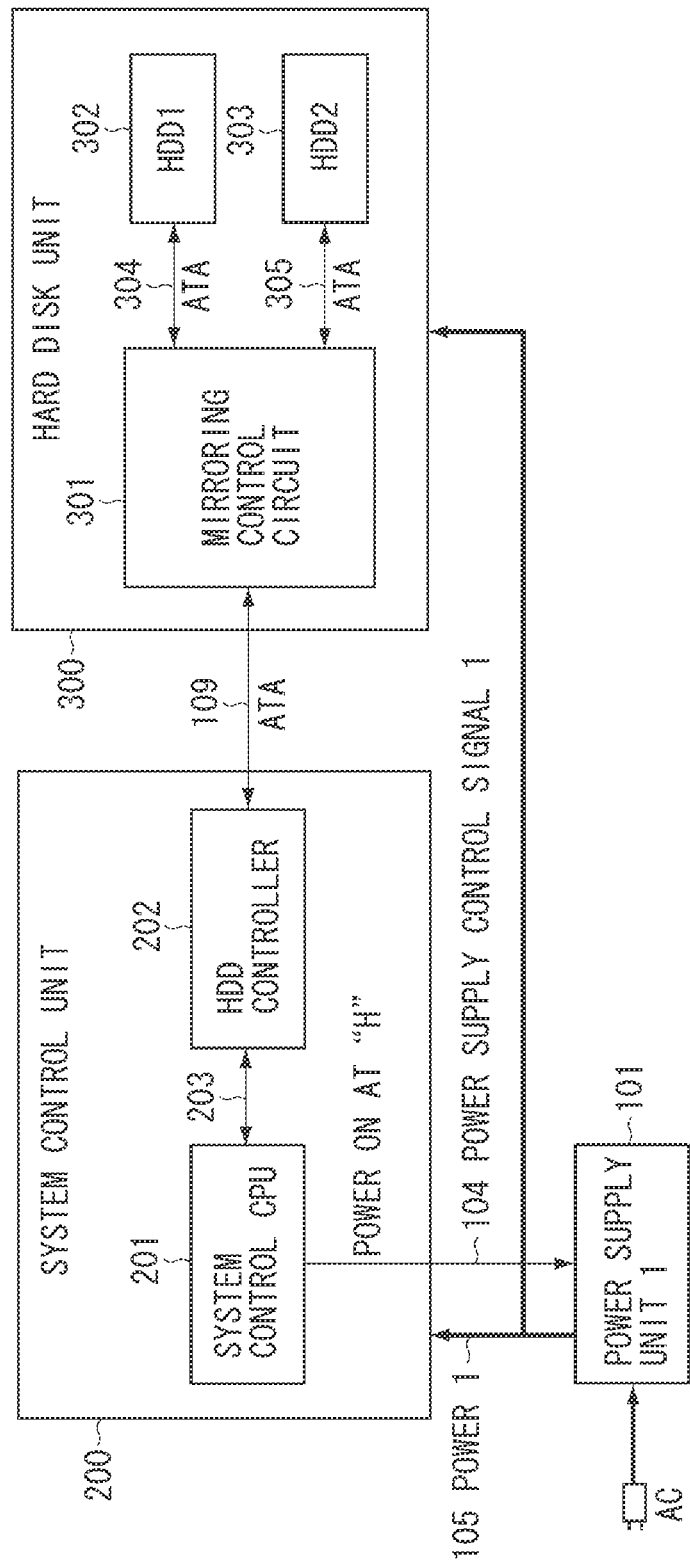
FIG. 7 is a block diagram illustrating an example of a power supply control configuration of an information processing apparatus according to a second exemplary embodiment of the present invention.

FIG. 7 is a block diagram illustrating an example of a power supply control configuration of an information processing apparatus according to a second exemplary embodiment of the present invention. The same reference numerals are assigned to the same components as those in FIG. 1, and descriptions thereof will not be repeated. In the present exemplary embodiment, in response to a request for readout of a status from the system control CPU 201, the mirroring control circuit 301, if the rebuild operation or the patrol operation is in progress, sends the status information to the system control CPU 201 via the HDD controller 202.

In the present exemplary embodiment, a rebuild stop command or a patrol stop command from the system control CPU 201 to the mirroring control circuit 301 is prepared. Then, the system control CPU 201 issues the above-described command to the mirroring control circuit 301 at the time of the shutdown (or sleep) processing, and suspends the rebuild or patrol processing by the mirroring control circuit 301.

The mirroring control circuit 301 is provided with a storage unit (e.g., a flash memory) that stores an HDD address, on which rebuild (or patrol) has been processed, suspended in response to the command or the like from the system control CPU 201. Then, when the processing of the command is completed and the rebuild (or patrol) processing is resumed, the mirroring control circuit 301 executes the rebuild (or patrol) operation continued from the suspension based on the HDD address, on which the rebuild (or patrol) has been processed, stored in the above-described storage unit.

Figure 8A:
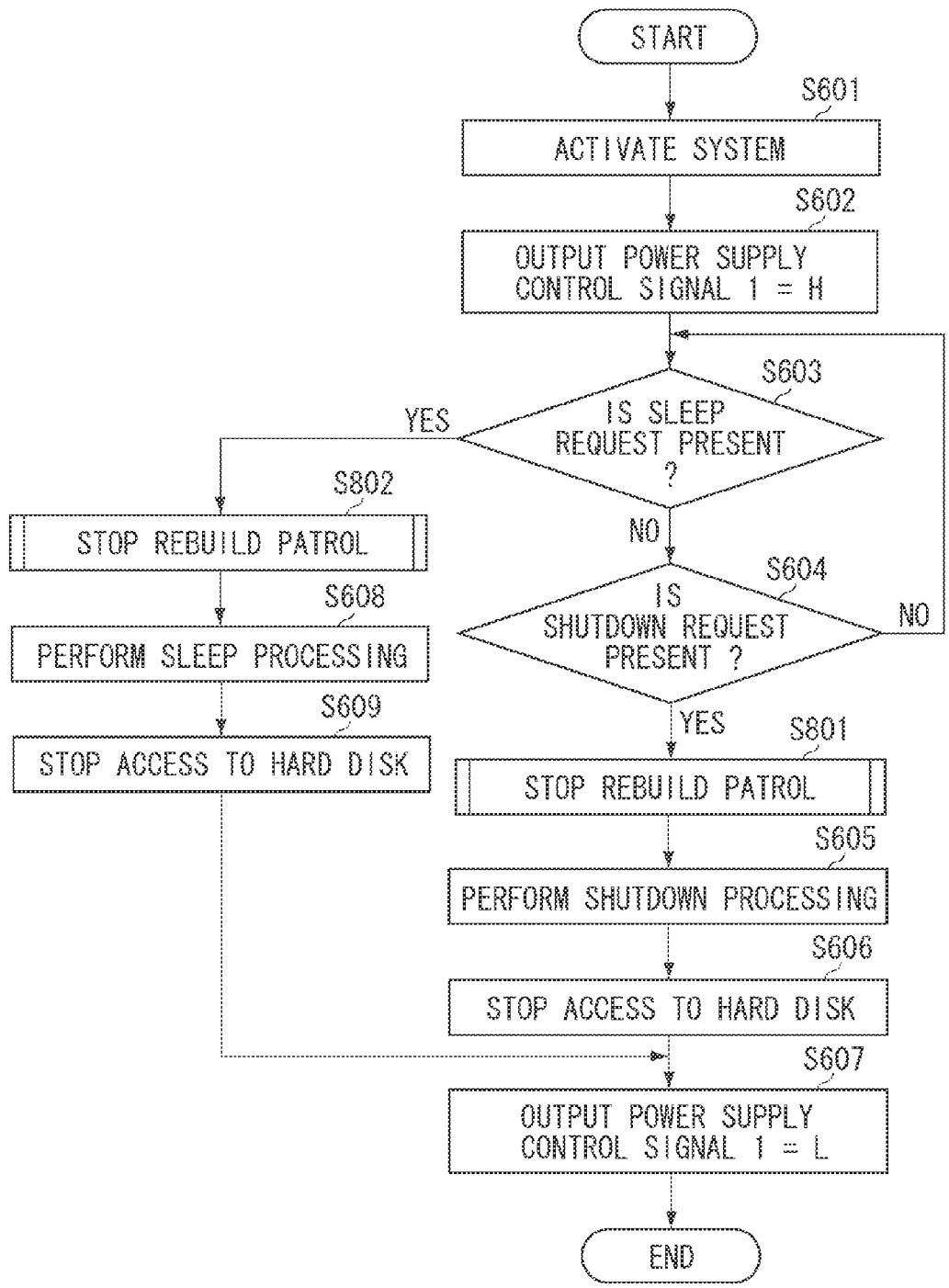
FIGS. 8A and 8B are flowcharts illustrating an operation by the system control CPU according to the second exemplary embodiment.
Figure 8B:
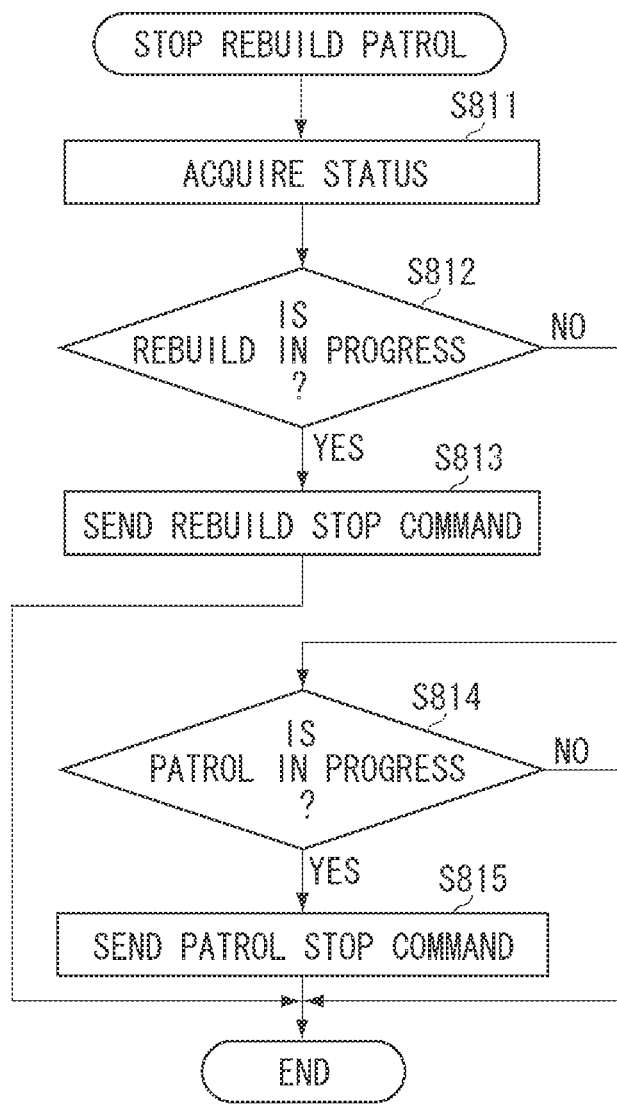

FIGS. 8A and 8B are flowcharts illustrating an operation by the system control CPU 201 according to the second exemplary embodiment. Processing of the flowchart is implemented by the system control CPU 201 by executing the software recorded in the ROM 253 or the HDD (HDD 1 or HDD 2). The same step numbers are assigned to the same steps as those in FIG. 6, and descriptions thereof will not be repeated.

If it is determined that a shutdown request is present (YES in step S604), then in step S801, the system control CPU 201 executes rebuild/patrol stop processing. Then, after the rebuild/patrol stop processing is completed, the processing proceeds to step S605. Further, if it is determined that the sleep request is present (YES in step S603), then in step S802, the system control CPU 201 executes the rebuild/patrol stop processing. Then, after the rebuild/patrol stop processing is completed, the processing proceeds to step S608.

The rebuild/patrol stop processing illustrated in steps S801 and S802 will be described below. In step S811, the system control CPU 201 sends a status readout request to the mirroring control circuit 301, and acquires a status of the mirroring control circuit 301. Then in step S812, the system control CPU 201 determine whether rebuild is in progress in the mirroring control circuit 301, based on the status acquired in step S811. Then, if it is determined that the rebuild is in progress in the above-described step S812 (YES in step S812), then in step S813, the system control CPU 201 sends the rebuild stop command to the mirroring control circuit 301, and terminates the rebuild/patrol stop processing.

On the other hand, if the system control CPU 201 determines that the rebuild is not in progress in the above-described step S812 (NO in step S812), then in step S814, the system control CPU 201 determines whether the patrol is in progress in the mirroring control circuit 301, based on the status acquired in step S811. Then, if it is determined that the patrol is in progress in the above-described step S814 (YES in step S814), then in step S815, the system control CPU 201 sends the patrol stop command to the mirroring control circuit 301, and terminates the rebuild/patrol stop processing. On the other hand, if the system control CPU 201 determines that the patrol is not in progress in the above-described step S814 (NO in step S814), the system control CPU 201 directly terminates the rebuild/patrol stop processing.

According to the present exemplary embodiment, the mirroring control circuit 301 can prevent occurrence of power shutoff to the HDDs, and occurrence of failure to the HDDs, while the rebuild (or patrol) is in progress.

Figure 9:
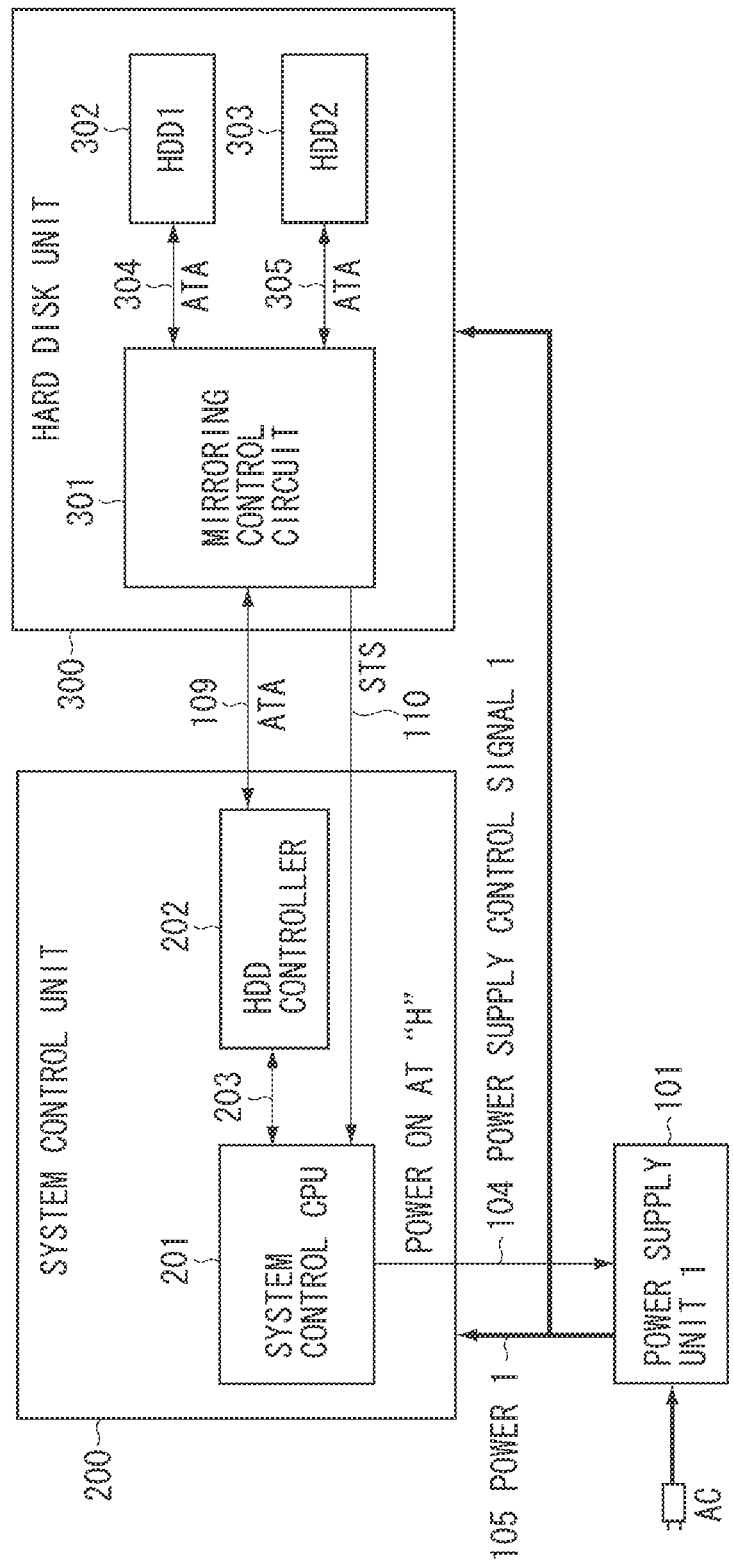
FIG. 9 is a block diagram illustrating an example of a power supply control configuration of an information processing apparatus according to a third exemplary embodiment of the present invention.

FIG. 9 is a block diagram illustrating an example of a power supply control configuration of an information processing apparatus according to a third exemplary embodiment of the present invention. The same references numerals are assigned to the same components as those in FIG. 1, and descriptions thereof will not be repeated. A system according to the present exemplary embodiment is a system in which a specific command and status are not prepared between the system control unit 200 and the HDD unit 300. In such a system, the mirroring control circuit 301 sends out a signal indicating that the rebuild or the patrol is in progress (a Synchronous Transport Signal (STS) signal 110), if the rebuild or the patrol is in progress, to the system control CPU 201. The STS signal 110 becomes "H" while the rebuild or the patrol is in progress, and becomes "L" while the rebuild is neither in progress nor the patrol is in progress.

The system control CPU 201, while the mirroring control circuit 301 is currently executing rebuild or patrol, does not shift to the shutdown or sleep, but delays the shutdown or the sleep until the rebuild or the patrol is completed.

Figure 10:
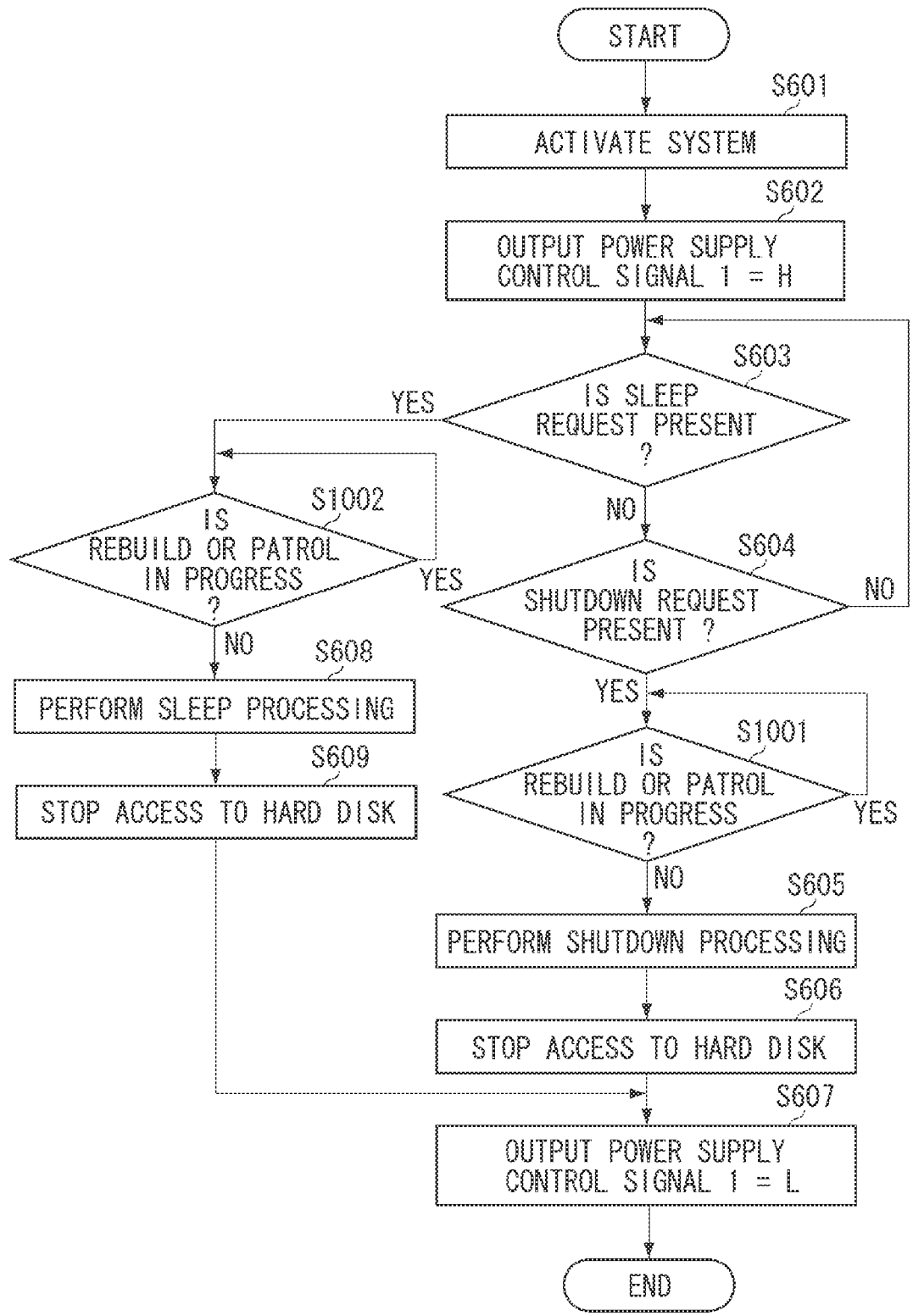
FIG. 10 is a flowchart illustrating an operation by the system control CPU according to the third exemplary embodiment.

FIG. 10 is a flowchart illustrating an operation by the system control CPU 201 according to the third exemplary embodiment. Processing of the flowchart is implemented by the system control CPU 201 by executing the software recorded in the ROM 253 or the HDD (HDD1 or HDD2). The same step numbers are assigned to the same steps as those in FIG. 6, and descriptions thereof will not be repeated.

If it is determined that a shutdown request is present (YES in step S604), then in step S1001, the system control CPU 201 determines whether rebuild is in progress or patrol is in progress, based on a state of the STS signal 110 output from the mirroring control circuit 301. Then, if it is determined that the rebuild or the patrol is in progress (the STS signal 110 is "H") in the above-described step S1001 (YES in step S1001), then the system control CPU 201 repeats processing in step S1001 until the rebuild or the patrol is completed (the STS signal 110 becomes "L"). On the other hand, if the system control CPU 201 determines that the rebuild or the patrol is not in progress (the STS signal 110 is "L") in the above-described step S1001 (NO in step S1001), then the system control CPU 201 advances the processing to step S605.

If it is determined that a sleep request is present (YES in step S603), then in step S1002, the system control CPU 201 determine whether the rebuild or the patrol is in progress, based on a state of the STS signal 110 output from the mirroring control circuit 301. Then, if it is determined that the rebuild is in progress or the patrol is in progress (the STS signal 110 is "H") in the above-described step S1002 (YES in step S1002), then the system control CPU 201 repeats the processing in step S1002, until the rebuild or the patrol is completed (the STS signal 110 becomes "L"). On the other hand, if the system control CPU 201 determine that the rebuild or the patrol is not in progress (the STS signal 110 is "L") in the above-described step S1002 (NO in step S1002), then the system control CPU 201 advances the processing to step S608.

According to the present exemplary embodiment, the mirroring control circuit 301 can prevent occurrence of power shutoff to the HDDs, and occurrence of failure to the HDDs, while the rebuild (or patrol) is in progress.

Figure 11:
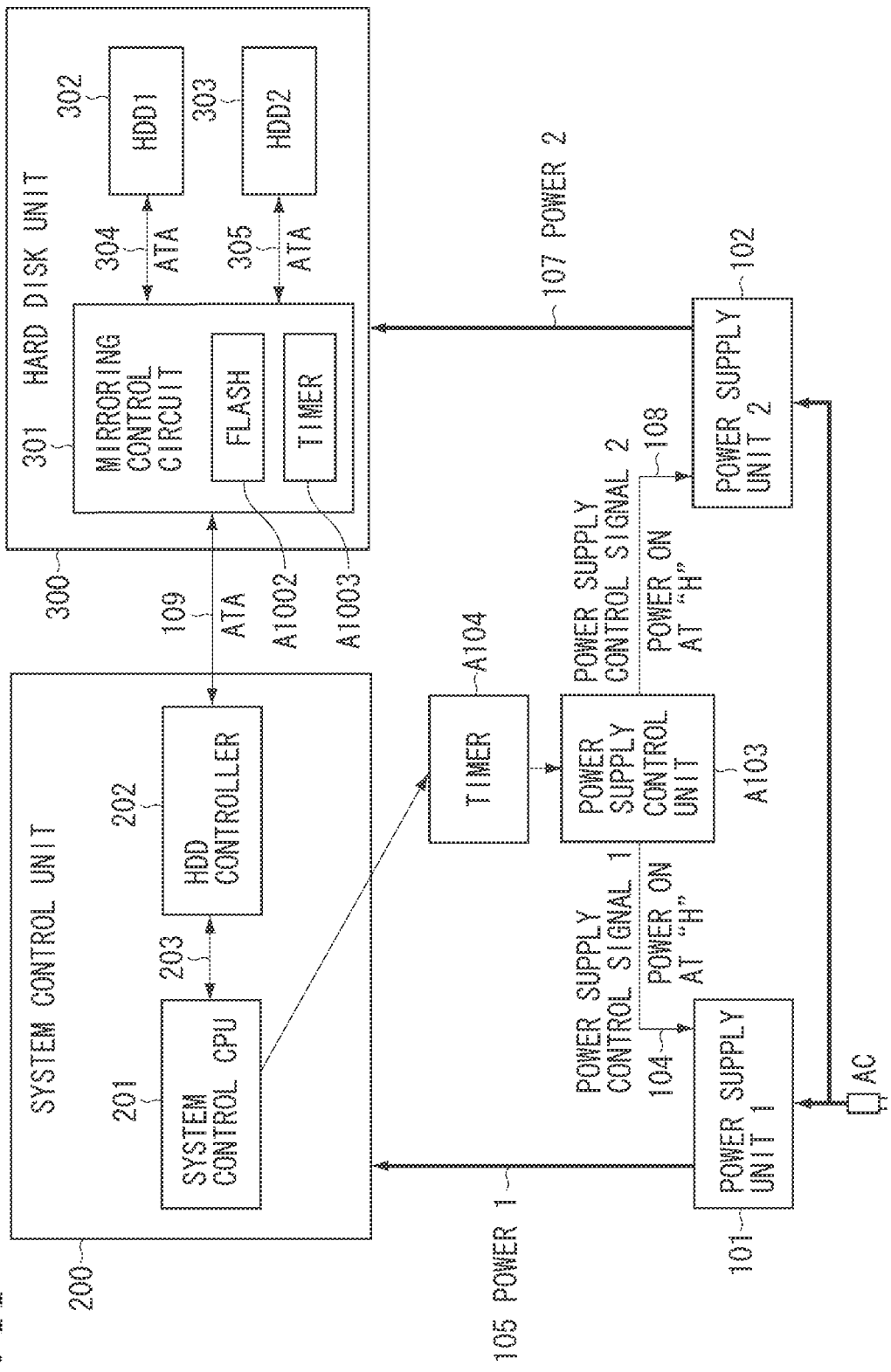
FIG. 11 is a block diagram illustrating an example of a power supply control configuration of an information processing apparatus according to a fourth exemplary embodiment of the present invention.

FIG. 11 is a block diagram illustrating an example of a power supply control configuration of an information processing apparatus according to a fourth exemplary embodiment of the present invention. The same reference numerals are assigned to the same components as those in FIG. 1, and descriptions thereof will not be repeated. A power supply control unit A103 outputs a power supply control signal 1 (104) to a power supply unit 1 (101), and a power supply control signal 2 (108) to a power supply unit 2 (102), respectively, and controls off/on of the power supply unit 1 (101) and the power supply unit 2 (102).

A timer (first time counting unit) A104 is connected to the power supply control unit A103. In a mirroring control circuit 301 in FIG. 11, a flash memory A1002 can retain information. Further, a timer (second time counting unit) A1003 can count time.

The system control CPU 201 according to the present exemplary embodiment performs time designation to the timer A104. The timer A104 notifies the power supply control unit A103 that the timer A104 is time designated, and the power supply control unit A103 sets the power supply control signal 1 (104) to low. Accordingly, the power supply unit 1 (101) is turned off (power supply to the system control unit 200 is stopped).

Further, the timer A104, when the designated time has elapsed, notifies accordingly the power supply control unit A103, and the power supply control unit A103 sets the power supply control signal 2 (108) to low. Consequently, the power supply unit 2 (102) is turned off (power supply to the HDD unit 300 is stopped).

The timer A104 and the power supply control unit A103 are operated with an all-night power source (not illustrated). For this reason, the timer A104 and the power supply control unit A103 can be operated even when the power supply unit 1 (101) and the power supply unit 2 (102) are turned off. If an AC power is turned off, power supply to the timer A104 and the power supply control unit A103 is also shut off.

A configuration example of an MFP, in which a circuit illustrated in FIG. 11 is mounted, is similar to FIG. 2. In other words, since the relation between FIG. 2 and FIG. 11 is similar to a relation between FIG. 2 and FIG. 1, descriptions thereof will not be repeated. The mirroring control circuit 301 can receive commands from the system control CPU 201 via the ATA signal line 109. The mirroring control circuit 301 according to the present exemplary embodiment can receive expanded commands which are vendor uniquely set up, in addition to the normal ATA command.

FIG. 12 illustrates a list of vendor-unique expanded commands, which have been set in the fourth exemplary embodiment. As seen from FIG. 12, the ATA command is broadly divided into a "PIOOUT" command that transfers data from the host (the system control unit 200) to the HDDs, a "PIOIN" command that transfers data from the HDDs to the host, and a "NONDATA" command that does not involve data transfer.

The expanded commands sent from the system control unit 200 are interpreted only within the mirroring control circuit 301. In other words, the expanded commands sent from the system control unit 200 are not notified to the HDDs (302 and 303) via the ATA signal lines (304 and 305). The expanded commands will be given below.

SETUP REBUILD: command for executing setting of rebuild function (PIOOUT)
START REBUILD: command for instructing rebuild start (NONDATA)
PAUSE REBUILD: command for instructing rebuild suspension (NONDATA)
RESTART REBUILD: command for instructing rebuild resumption (NONDATA)
SETUP PATROL: command for executing setting of patrol function (PIOOUT)
START PATROL: command for instructing patrol start (NONDATA)
PAUSE PATROL: command for instructing patrol suspension (NONDATA)
RESTART PATROL: command for instructing patrol resumption (NONDATA)

FIG. 13 illustrates an example of data sent from the system control unit 200 to the mirroring control circuit 301, when the SETUP REBUILD command as the PIOOUT command is executed. The data is generated by the system control unit 200. The data includes, as illustrated in FIG. 13, a "rebuild extension time", an "availability of automatic rebuild", an "availability of verification at the time of rebuild", a "rebuild execution range", a "front sector, size of region "A"", and the like. Each data will be described below.

The "rebuild extension time" is data designated in seconds, and rebuild will be completed after the lapse of a number of seconds designated here. The "availability of automatic rebuild" is data for setting whether rebuild is to be automatically executed. The "availability of verification at the time of rebuild" is data for setting whether verification is to be executed at the time of rebuild. The "rebuild execution range" is data for setting whether rebuild is to be executed for the entire HDD or rebuild is to be executed for only a specific range. The "front sector, size of region "A"" is data for setting a range which has been set to a rebuild execution range.

FIG. 14 illustrates data sent from the system control unit 200 to the mirroring control circuit 301, when the SETUP PATROL command as the PIOOUT command is executed. The data is generated by the system control unit 200. The data, as illustrated in FIG. 14, includes a "patrol extension time", a "start condition", a "patrol execution range", a "front sector, size of region "A", and the like. Each data will be described below.

The "patrol extension time" is data designated in seconds, and the patrol will be completed after the lapse of a number of seconds designated here. The mirroring control circuit 301 will set the designated patrol extension time for the timer A1003. The "start condition" is data indicating the start condition of patrol. The "patrol execution range" is data for setting whether patrol is to be executed for the entire HDD, or patrol is to be executed for only a specific range. The "front sector, size of region "A"" is data for setting a range which has been set for the patrol execution range.

Though not illustrated, also in the present exemplary embodiment, the system control CPU 201 can send a request for status readout to the mirroring control circuit 301, and can acquire status information of the mirroring control circuit 301. In response to the request for status readout from the system control CPU 201, if the rebuild is in progress or the patrol is in progress, the mirroring control circuit 301 sends the status information to the system control CPU 201 via the HDD controller 202. The rebuild operation is similar to that in the first exemplary embodiment. However, in the first exemplary embodiment, the specific operation in-progress signal (106 in FIG. 1) is set to "H", while the rebuild is in progress, and becomes "L" when the rebuild is completed. In contrast to this, in the present exemplary embodiment, since the specific operation in-progress signal line is not provided, the rebuild does not operate in the above-described manner.

The patrol function is similar to that in the first exemplary embodiment. However, in the first exemplary embodiment, the specific operation in-progress signal (106 in FIG. 1) is set to "H" while the patrol is in progress, and becomes "L" when the patrol is completed. In contrast to this, in the present exemplary embodiment, since the specific operation in-progress signal line is not provided, the patrol does not operate in the above-described manner.

The mirroring control circuit 301 stores in a flash memory A1002 the HDD address, on which the rebuild (or patrol) has been processed, suspended in response to a command or the like from the system control CPU 20. Then, the mirroring control circuit 301, when resuming a next operation, executes the rebuild (or patrol) continued from the suspension based on the HDD address stored in the flash memory A1002.

When a system is normally operating, "H" as a power supply control signal 1 (104) is output from the power supply control unit (103), and "H" is input to the power supply unit 1 (101). Accordingly, the power 1 (105) is supplied to the system control unit A200. Further, the timer A104 is not set up during a normal operation, and "H" is input to the power supply unit 2 (102) as a power supply control signal 2 (108) from the power supply control unit A103, and the power supply unit 2 supplies the power 2 (107) to the HDD unit 300. In this state, when the HDD 2 fails and is replaced, the mirroring control circuit A301 starts the rebuild operation in accordance with the rebuild condition. In order to complete the rebuild, about 30 minutes is required if an 80 GB HDD is assumed.

An operation when a shift to the sleep is instructed by an operator during the rebuild operation will be described. A number of times that power supply can be turned off/on until an HDD breaks down, is specified to each HDD, and thus turning a power off/on too frequently will lead to a shorter lifetime of the HDD. Therefore, recently, there is mounted a mechanism for energizing the HDD for a half hour or around one hour, even after the sleep processing has been executed. If resuming-from-sleep processing becomes necessary during this period of time, resuming from sleep is available without turning a power of the HDD off/on, and thus a lifetime of the HDD can be elongated. This kind of system is also used in the present exemplary embodiment.

First, the system control CPU 201, when determining to shift to the sleep, acquires "how much longer must we wait before stopping power supply from the power supply unit 2 (102) (power shutoff time)". In the present exemplary embodiment, the power shutoff time is to be set in advance and is to be stored in the ROM 253. Next, the system control CPU 201 sends a time shorter by a power shutoff preparatory time than the power shutoff time as the rebuild extension time (or patrol extension time), to the mirroring control circuit 301 in response to the expanded command (SETUP REBUILD or SETUP PATROL). The "Power shutoff preparatory time" corresponds to a length of time during which power shutoff preparatory processing is executed by the HDD unit 300, which is set in advance and stored in the ROM 253. The power shutoff preparatory processing includes suspending the rebuild (or patrol), saving up to which sector the rebuild (or patrol) has been executed in the flash memory A1002, solving cache and issuing a standby command or the like, and preparing for stopping of power supply.

After that, the system control unit 200 sets up a power shutoff time to the timer A104. Then, the timer A104 notifies the power supply control unit A103 that the power shutoff time has been set up for the timer A104. The power supply control unit A103, upon receiving notification that the power shutoff time has been set up from the timer A104, sets the power supply control signal 1 (104) to "L", thereby stopping the power supply unit 1 from outputting power. As a result, a power of the system control unit 200 is turned off. Further, the power supply control unit A103 does not set the power supply control signal 2 (108) to "L" (keeps it as "H") after a power shutoff time has been designated to the timer A104, until the timer A104 counts the lapse of the power shutoff time. For this reason, an output of the power supply unit 2 (102) is continued until the power shutoff time has elapsed, and power continues to be supplied to the HDD unit 300.

In addition, the mirroring control circuit 301, which receives the rebuild extension time (or patrol extension time), saves the rebuild extension time (or patrol extension time) in the flash memory A1002, and sets up the rebuild extension time (or patrol extension time) for the timer A1003. Accordingly, the timer A1003 starts time counting of the rebuild extension time (or patrol extension time).

The mirroring control circuit 301, when the timer A1003 counts the lapse of the designated time, executes the above-described power shutoff preparatory processing. After that, the power shutoff time has elapsed, and the timer A104 counts the lapse of the designated time. At this time, the power supply control unit A103 sets the power supply control signal 2 (108) to "L", and power supply from the power supply unit 2 (102) to the HDD unit 300 is stopped. The above-described power shutoff preparatory processing has been performed before power shutoff, so that failure may not occur in the HDDs (HDD 1 and HDD 2).

Figure 15A:
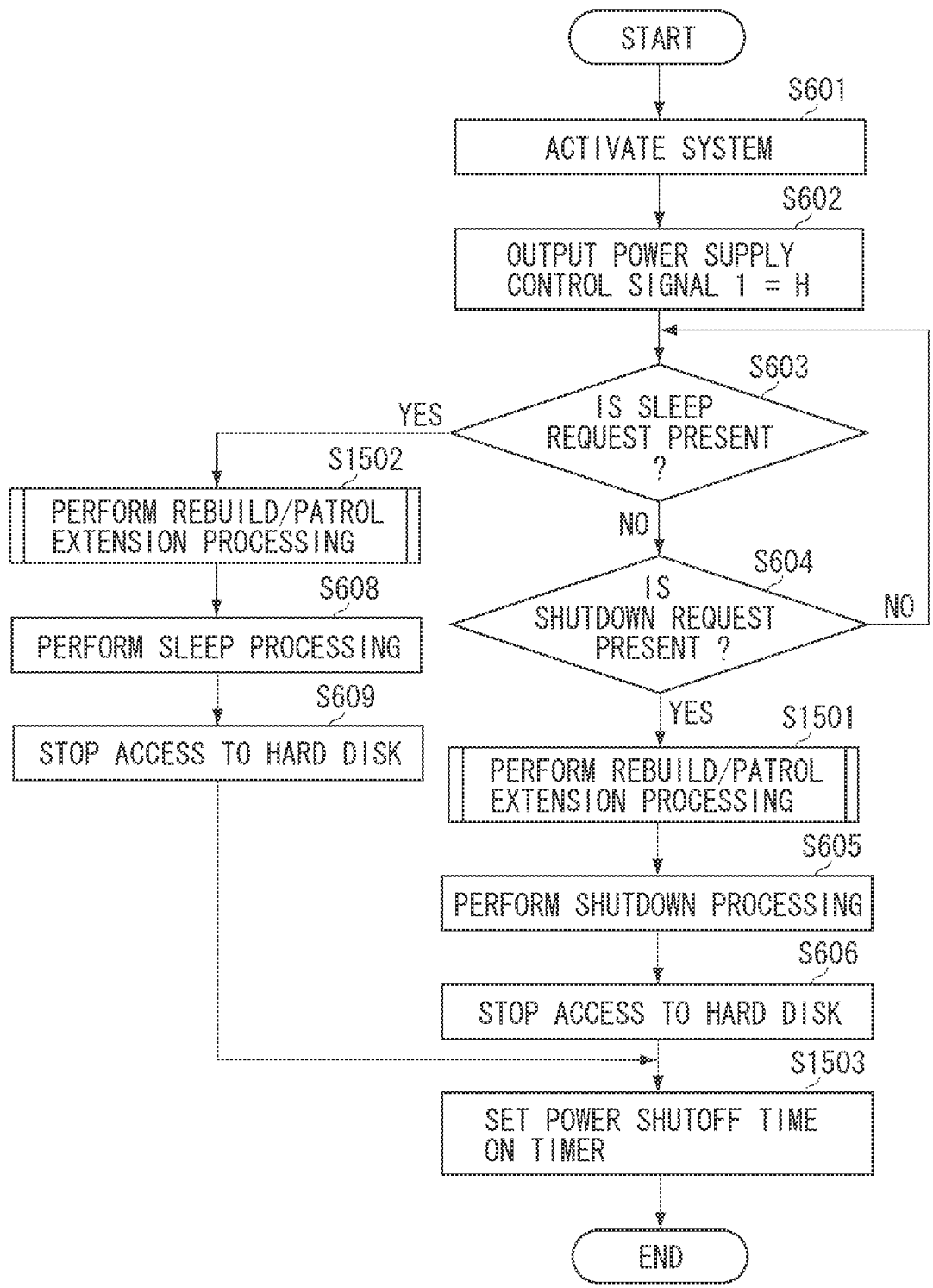
FIGS. 15A and 15B are flowcharts illustrating an operation by the system control CPU according to the fourth exemplary embodiment.
Figure 15B:
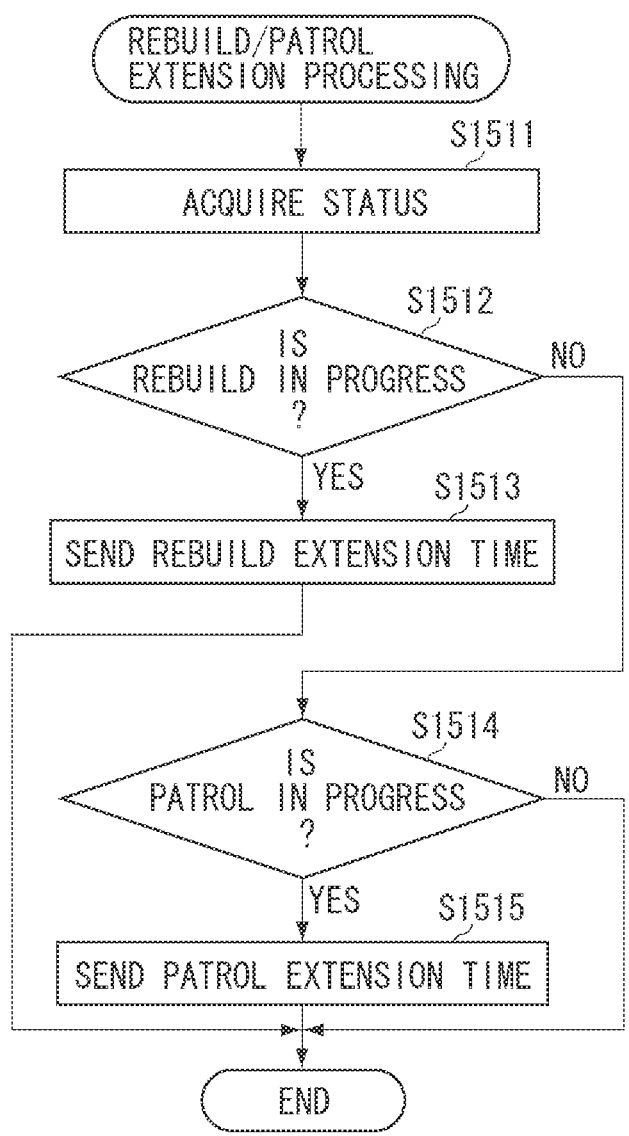

FIGS. 15A and 15B are flowcharts illustrating an operation of the system control CPU 201 according to the fourth exemplary embodiment. Processing of the flowchart is implemented by the system control CPU 201 by executing the software recorded in the ROM 253 or the HDD (HDD1 or HDD2). The same step numbers are assigned to the same steps as those in FIG. 6, and descriptions thereof will not be repeated.

If it is determined that a shutdown request is present (YES in step S604), then in step S1501, the system control CPU 201 executes the rebuild/patrol extension processing. Then, after the rebuild/patrol extension processing is completed, the processing proceeds to step S605. Further, if it is determined that asleep request is present (YES in step S603), then instep S1502, the system control CPU 201 executes the rebuild/patrol extension processing. Then, after the rebuild/patrol extension processing is completed, the processing proceeds to step S608. Then, in step S1503, after an access stop to the HDD (steps S606 or S609), the system control CPU 201 sets the power shutoff time for the timer A104, and terminates the processing of the flowchart.

The rebuild/patrol extension processing illustrated in steps S1501 and S1502 will be described below. In step S1511, the system control CPU 201 sends a request for status readout to the mirroring control circuit 301, and acquires a status of the mirroring control circuit 301. Then, in step S1512, the system control CPU 201 determines whether rebuild is in progress in the mirroring control circuit 301 based on the status acquired in step S1511. Then, if it is determined that the rebuild is in progress in the above-described step S1512 (YES in step S1512), the system control CPU 201 advances the processing to step S1513. In step S1513, the system control CPU 201 sends a rebuild extension time to the mirroring control circuit 301 according to the SETUP REBUILD command, and terminates the rebuild/patrol extension processing. The rebuild extension time is set to be a time shorter by the power shutoff preparatory time than the power shutoff time.

On the other hand, if it is determined that the rebuild is not in progress in the above-described step S1512 (NO in step S1512), the system control CPU 201 advances the processing to step S1514. In step S1514, the system control CPU 201 determines whether the patrol is in progress. Then, if it is determined that the patrol is in progress in the above-described step S1514 (YES in step S1514), then in step S1515, the system control CPU 201 sends a patrol extension time to the mirroring control circuit 301 in response to the SETUP PATROL command, and terminates the rebuild/patrol extension processing. The patrol extension time is set to a time shorter by the power shutoff preparatory time than the power shutoff time. On the other hand, if determining that the patrol is not in progress in the above-described step S1514 (NO in step S1514), the system control CPU 201 directly terminates the rebuild/patrol extension processing.

In the present exemplary embodiment, such a configuration is illustrated that the system control CPU 201, when shifting to the sleep or shutdown, sends a rebuild (or patrol) extension time to the mirroring control circuit 301, and causes the timer A1003 to count time. However, the system control CPU 201 may send in advance the rebuild (or patrol) extension time to the mirroring control circuit 301, to be stored in the flash memory A1002, and may send a command which serves as a trigger for the sleep or shutdown. In this case, the mirroring control circuit 301, when acquiring a command which serves as a trigger for the sleep or the like from the system control CPU 201, causes the timer A1003 to start time counting of the above-described rebuild (or patrol) extension time.

In the present exemplary embodiment, a configuration has been illustrated in which the system control CPU 201 shifts to the sleep or shutdown, sends the rebuild (or patrol) extension time to the mirroring control circuit 301, and causes the timer A1003 to count time. However, the system control CPU 201 may send in advance the rebuild (or patrol) extension time to the mirroring control circuit 301 to be stored in the flash memory A1002, and may send a command which serves as a trigger for the sleep or shutdown to the mirroring control circuit 301. In this case, the mirroring control circuit 301, when acquiring a command which serves as a trigger for the sleep or the like from the system control CPU 201, causes the timer A1003 to start time counting of the above-described rebuild (or patrol) extension time.

In the present exemplary embodiment, sending a time shorter by the power shutoff preparatory time than the power shutoff time, as the rebuild (or patrol) extension time to the mirroring control circuit 301, has been described. However, the power shutoff time may be sent, as the rebuild (or patrol) extension time, to the mirroring control circuit 301. In this case, in the mirroring control circuit 301, a time shorter by the power shutoff preparatory time than the power shutoff time is set for the timer A1003. In other words, in the mirroring control circuit 301, as long as a time shorter by the power shutoff preparatory time than the power shutoff time is measured, any configuration may be used.

In FIGS. 15A and 15B, a status of the mirroring control circuit 301 is acquired, and the rebuild extension time if the rebuild is in progress, or the patrol extension time if the patrol is in progress, is sent to the mirroring control circuit 301. However, the status of the mirroring control circuit 301 may not be acquired, and both the rebuild extension time and the patrol extension time may be sent to the mirroring control circuit 301. In this case, the mirroring control circuit 301 uses the rebuild extension time if the rebuild is in progress, or the patrol extension time if the patrol is in progress.

Further, in the present exemplary embodiment, the rebuild extension time is sent in response to the SETUP REBUILD command, and the patrol extension time is sent in response to the SETUP PATROL command. However, one expanded command may be sent as an extension time by eliminating distinction between the rebuild extension time and the patrol extension time. In this case, the mirroring control circuit 301 is configured to set the extension time for the timer A1003, and after measurement of the extension time, to execute power shutoff preparatory processing.

As described above, according to the present exemplary embodiment, while carrying out power-saving by stopping power supply to the system control unit 200, system protection can be implemented by the mirroring in which power supply to the HDD unit 300 is performed when execution of the rebuild or the patrol function is in progress. Further, according to the present exemplary embodiment, even when the mirroring control circuit 301 enters into the sleep mode while the rebuild is in progress, the rebuild operation can be continued for a length of the rebuild extension time (or patrol extension time).

As described above, in the exemplary embodiments of the present invention, at the time of the rebuild or the patrol operation in the mirroring system, it becomes possible to shut down a power of the system control unit 200 independently of the mirroring system. Accordingly, at the time of the sleep or shutdown, the power can be kept shutdown except the mirroring system that is in the process of operating. Further, even when it should be absolutely necessary to shut off the power after a given time due to a power outage or the like, it is also possible to suspend the rebuild or the patrol operation within the designated time.

Aspects of the present invention can also be realized by a computer of a system or apparatus, or devices such as a CPU, a micro-processing unit (MPU), and/or the like, that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-232508 filed Oct. 6, 2009, which is hereby incorporated by reference herein in its entirety.

What is claimed is:

1. An information processing apparatus comprising:
a system control unit configured to execute control of the entire information processing apparatus;
a plurality of storage units;
a mirroring control unit configured to control mirroring control for the plurality of storage units;
a first power supply unit configured to supply power to the system control unit;
a second power supply unit configured to supply power to the mirroring control unit and the plurality of storage units; and
a power supply control unit configured to control the second power supply unit to reduce power supply to the mirroring control unit and the plurality of storage units, when a shift condition for shifting a power state of the information processing apparatus to a power-saving state is satisfied,
wherein, even when the shift condition has been satisfied, in a case that rebuild operation for the plurality of storage units is in progress by the mirroring control unit, the power supply control unit does not control the second power supply unit to reduce power supply to the mirroring control unit and the plurality of storage units.

2. The information processing apparatus according to claim 1, wherein the first power supply unit executes supply or stoppage of power according to a signal state of a first power supply control signal output from the system control unit,
wherein the second power supply unit executes supply or stoppage of power according to a signal state of a second power supply control signal output from the power supply control unit,
wherein the mirroring control unit, when the specific operation is in progress, sets a specific operation in-progress signal, to be output to the power supply control unit, to a signal state indicating that the specific operation is in progress, and
wherein, in at least one of a case where the first power supply control signal is in a signal state requesting for power supply and a case where the specific operation in-progress signal is in a signal state indicating that the specific operation is in progress, the power supply control unit outputs the second power supply control signal set to a signal state requesting for power supply.

3. The information processing apparatus according to claim 2, wherein the system control unit, when the system control unit is stopped, sets the first power supply control signal to a signal state requesting for stoppage of power supply,
wherein the mirroring control unit, if the specific operation is not in progress, sets the specific operation in-progress signal to a signal state indicating that the specific operation is not in progress, and
wherein, in neither of a case where the first power supply control signal is in a signal state requesting for power supply and a case where the specific operation in-progress signal is in a signal state indicating that the specific operation is in progress, the power supply control unit sets the second power supply control signal to a signal state requesting for stoppage of power supply.

4. The information processing apparatus according to claim 3, wherein when the system control unit is stopped includes a case where the information processing apparatus shifts to the power-saving state, or a case where shutdown is executed.

5. The information processing apparatus according to claim 2, wherein the power supply control unit generates the second power supply control signal as a logical sum of the first power supply control signal and the specific operation in-progress signal.

6. A power supply control method for an information processing apparatus including a system control unit configured to execute control of the entire information processing apparatus, a plurality of storage units, and a mirroring control unit configured to control mirroring operation for the plurality of storage units, the power supply control method comprising:

supplying power from a first power supply unit to the system control unit;

supplying power from a second power supply unit to the mirroring control unit and the plurality of storage units;

when a shift condition for shifting a power state of the information processing apparatus to a power-saving state is satisfied, controlling the second power supply unit to reduce power supply to the mirroring control unit and the plurality of storage units; and even when the shift condition has been satisfied, in a case that rebuild operation for the plurality of storage units is in progress by the mirroring control unit, not controlling the second power supply unit unit to reduce power supply to the mirroring control unit and the plurality of storage units.

7. An information processing apparatus comprising:

a system control unit configured to execute control of the entire information processing apparatus;

a plurality of storage units;

a mirroring control unit configured to control mirroring operation for the plurality of storage units;

a first power supply unit configured to supply power to the system control unit;

a second power supply unit configured to supply power to the mirroring control unit and the plurality of storage units; and a power supply control unit configured to control the second power supply unit to reduce power supply to the mirroring control unit and the plurality of storage units, when a shift condition for shifting a power state of the information processing apparatus to a power-saving state is satisfied, wherein, even when the shift condition has been satisfied, in a case that patrol operation for the plurality of storage units is in progress by the mirroring control unit, the power supply control unit does not control the second power supply unit to reduce power supply to the mirroring control unit and the plurality of storage units.

8. A power supply control method for an information processing apparatus including a system control unit configured to execute control of the entire information processing apparatus, a plurality of storage units, and a mirroring control unit configured to control mirroring operation for the plurality of storage units, the power supply control method comprising:

controlling mirroring operation for the plurality of storage units;

supplying power from a first power supply unit to the system control unit;

supplying power from a second power supply unit to the mirroring control unit and the plurality of storage units;

when a shift condition for shifting a power state of the information processing apparatus to a power-saving state is satisfied, controlling the second power supply unit to reduce power supply to the mirroring control unit and the plurality of storage units; and even when the shift condition has been satisfied, in a case that patrol operation for the plurality of storage units is in progress by the mirroring control unit, not controlling the second power supply unit to reduce power supply to the mirroring control unit and the plurality of storage units.

\* \* \* \* \*